US007828007B2

(12) United States Patent
Loubert et al.

(10) Patent No.: US 7,828,007 B2
(45) Date of Patent: Nov. 9, 2010

(54) AUTOMATIC PUMP CONTROL DEVICE

(75) Inventors: Craig A. Loubert, Plymouth, MN (US); William P. Nugent, Wayzata, MN (US)

(73) Assignee: Pneumadyne, Inc., Plymouth, MN (US)

( * ) Notice: Subject to any disclaimer, the term of this patent is extended or adjusted under 35 U.S.C. 154(b) by 550 days.

(21) Appl. No.: 11/771,891

(22) Filed: Jun. 29, 2007

(65) Prior Publication Data

US 2008/0006325 A1 Jan. 10, 2008

Related U.S. Application Data

(60) Provisional application No. 60/817,725, filed on Jun. 30, 2006.

(51) Int. Cl.
*G05D 11/00* (2006.01)
*B67D 5/56* (2006.01)

(52) U.S. Cl. ........................ 137/99; 137/565.11; 222/57

(58) Field of Classification Search ..................... 137/1, 137/98, 99, 565.11; 222/52, 57
See application file for complete search history.

(56) References Cited

U.S. PATENT DOCUMENTS 2,526,920 A * 10/1950 Wise ........................... 137/99
3,097,605 A * 7/1963 Berkley ........................ 137/99
3,283,957 A * 11/1966 Henderson ................... 222/57
3,882,882 A * 5/1975 Preisig ........................ 137/98
4,369,805 A * 1/1983 Tavor .................... 137/101.31

* cited by examiner

*Primary Examiner*—John Fox
(74) *Attorney, Agent, or Firm*—Dicke, Billig & Czaja, PLLC

(57) ABSTRACT

An automatic pump control device for an injection pump used to inject fluid (typically methanol) into oil or natural gas wells to prevent freezing. The device enables the pump to operate at rates as low as one full stroke per 1.5 minutes (i.e., 0.67 stroke/min), substantially slower than current rates of approximately fifteen strokes per minute. The device comprises a main body; an extension air pilot; a retraction air pilot; a toggle mechanism that actuates the extension air pilot to extend the pump piston, that at the end of the extension stroke actuates a retraction air pilot to retract the pump piston, and that automatically continues the two stroke cycle; a drive mechanism for driving the toggle mechanism; an overstroke mechanism to prevent over driving the retraction air pilot at the end of its stroke; an optional stroke speed adjustment valve; a circuit to circulate and transport a gas; and piston, spool, and sleeve for switching the path of the gas. The automatic pump control device operates over a wide range of flow rates and pressure ranges, thus enabling installation of the automatic pump control device to virtually all manufacturers' injection pumps.

8 Claims, 24 Drawing Sheets

AUTOMATIC PUMP CONTROL DEVICE

CROSS-REFERENCE TO RELATED APPLICATION

This application claims the benefit of U.S. Provisional Patent Application No. 60/817,725 filed Jun. 30, 2006.

TECHNICAL FIELD

This application pertains to control devices for gas actuated, two-position valves, such as those used to inject chemicals into a chamber, and specifically of the type used to inject a fluid (such as methanol) into fossil fuel (oil or natural gas) wells to prevent freezing.

BACKGROUND

A fluid, typically methanol, is injected into natural gas wells to prevent freezing in extremely cold environments such as winter in Northern Canada. Freeze protection is accomplished with relatively little methanol if it is injected at regular intervals. Because electricity is not available at the remote locations of wellheads, the pressure of natural gas in the well is used to drive an injection pump that controls introduction of methanol (from a pressurized supply) into the natural gas pipe line.

For example, the model BR5000 Chemical Injector Pump (Bruin Instruments Corp., Edmonton, Alberta, Canada) is a single acting, positive displacement plunger type pump. The pump is powered with air or other gas pressure (50 psig-maximum) acting on a diaphragm, resulting in plunger displacement. When full stroke (1¼" inch) is reached, the internal switching system of the pump shuts off the supply gas (for example, natural gas used to power the pump) and vents the diaphragm chamber. The diaphragm is equipped with a return spring for retracting the plunger. The internal switching system toggles, for example, a micro switch to shut off the supply gas and vent the diaphragm chamber. A similar pump from the same manufacturer is the model 5100, which is powered by gas pressure as low as 8 psig (maximum 35 psig) and has a full stroke of one inch.

Current pump design is such that the injection pump cannot be operated reliably at very low stroke rates without losing the assurance that the pump has not hung-up in mid-stroke, thus failing to accomplish the desired injection of methanol. Because wellheads are in very remote locations, and are not actively monitored (due in large part to the lack of electricity to power monitoring equipment), the only viable option today is to operate the injection pumps at relatively high stroke speeds to ensure that they operate properly. The downside of high stroke speeds is high consumption of the natural gas used to power the pumps. This results in an environmental problem, as well as a financial problem, due to venting of natural gas to the atmosphere. Initially, the natural gas is used to displace the pump plunger and thereby inject methanol into the well. After the gas is used to displace the plunger, it is vented. It is vented because after gas expansion during displacement of the plunger, the gas has too little pressure to be captured and transported cost-effectively.

SUMMARY

This application describes an automatic control device for an injection pump used to inject a fluid into a source of a pressurized gas. The control devices comprises: a two position toggle valve, driven by the pressurized gas, to pulse between first and second positions that correspond to the extension and refraction of the injection pump shaft, respectively; a driver, coupled to the toggle valve, having first and second portions (preferably single-point contact surfaces) corresponding to first and second portions (preferably contact surfaces) of a linkage of the injection pump; and an overstroke mechanism to prevent overdriving the injection pump beyond full extension. The toggle valve pulses in a two-stroke cycle between the first and second positions to couple the respective first and second portions of the driver to the respective first and second portions of the linkage, thereby alternatively causing the extension and refraction of the shaft of the injection pump.

Another aspect of the application describes a method of controlling injection of a fluid by an injection pump into a source of a pressurized gas. The method comprises: (a) using the pressurized gas to power a two position toggle valve to pulse in a two-stroke cycle corresponding to first and second positions of the injection pump; and (b) preventing overdriving of the injection pump beyond full extension.

BRIEF DESCRIPTION OF THE DRAWINGS

The accompanying drawings show only one particularly preferred embodiment of an automatic pump control device as an example, and are not intended to limit the scope of the claims.

DETAILED DESCRIPTION

Introduction

This specification, solely for convenience of description, omits discussion of fittings and the like that would be understood by the person of ordinary skill in the art of valves and piping to be desirable, necessary, or included for any purpose.

General Operation

Figure 1:
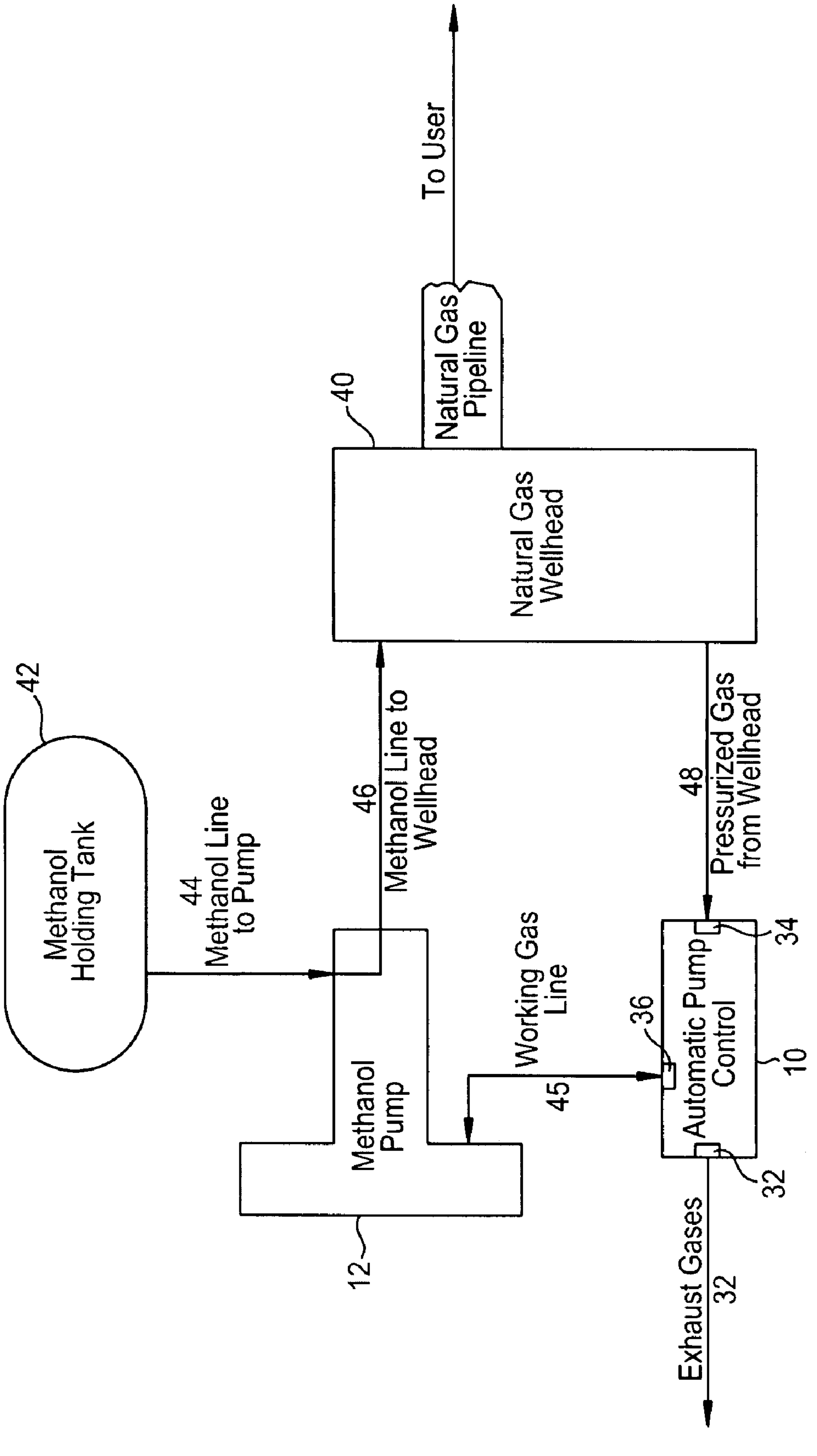
FIG. 1 is a block diagram of an automatic pump control device in its preferred operating context.

FIG. 1 is a block diagram of an embodiment of an automatic pump control device in its preferred, but not required, operating context, that is, one in which a gas powered, normally reciprocating, pump 12 is used to pump fluid methanol into wellhead 40 to keep natural gas from freezing as it exits wellhead 40 and travels through a gas pipeline to users. Natural gas pressure in well 40 varies depending upon the in situ geology at each wellhead 40, but the pressure is usually in the range of 10 psig to 59 psig. Methanol injection pump 12 is on site at wellhead 40 and pumps methanol from a methanol holding tank 42 through line 44 and then through line 46 to wellhead 40.

In general terms, automatic pump control device 10 controls the flow of working gas through a gas powered injection pump 12. It enables pump 12 to automatically switch between an extension phase and a retraction phase—the pump's two phase operating cycle. Automatic pump control device 10 uses a small volume of natural gas from wellhead 40 to power actuation of its two position mechanism. During the extension phase, natural gas flows from wellhead 40 through line 48 into input port 34 of device 10, through device 10, out of working gas port 36, through line 45, and into methanol pump 12, at approximately wellhead pressure. During the subsequent retraction phase, device 10 exhausts the natural gas from methanol pump 12, back through line 45, into working gas port 36, through device 10, and out exhaust port 32, where the spent gas is exhausted through line 32 to the atmosphere. After completion of the two phase cycle of device 10, the cycle automatically continues. The device only needs a continuous supply of pressurized gas to maintain continuous pump operation.

Installation to Injection Pump and Related Features

Figure 2A:
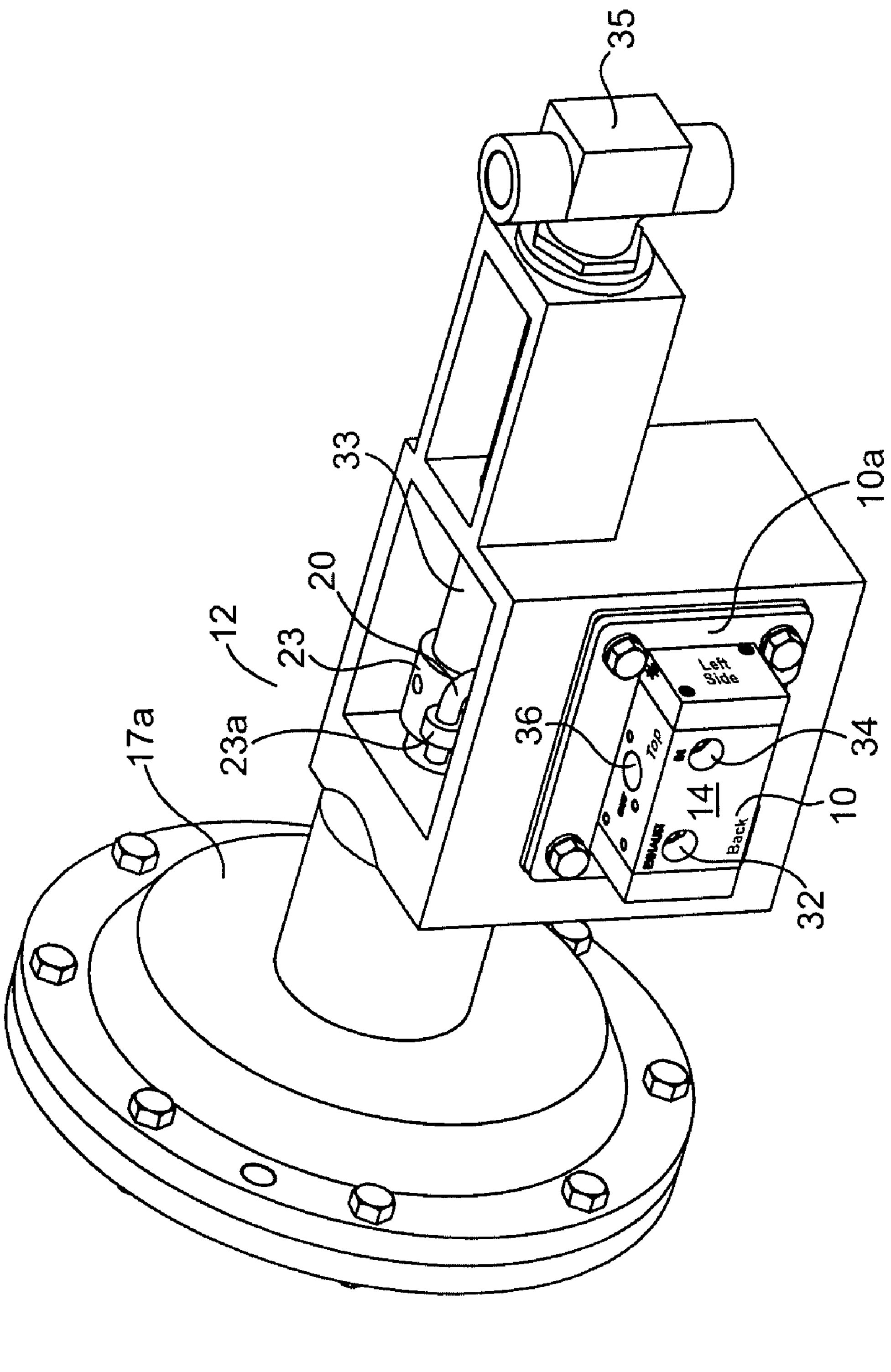
FIG. 2A is a perspective view, from the back, of the preferred embodiment, as mounted on a fluid injection pump.
Figure 2B:
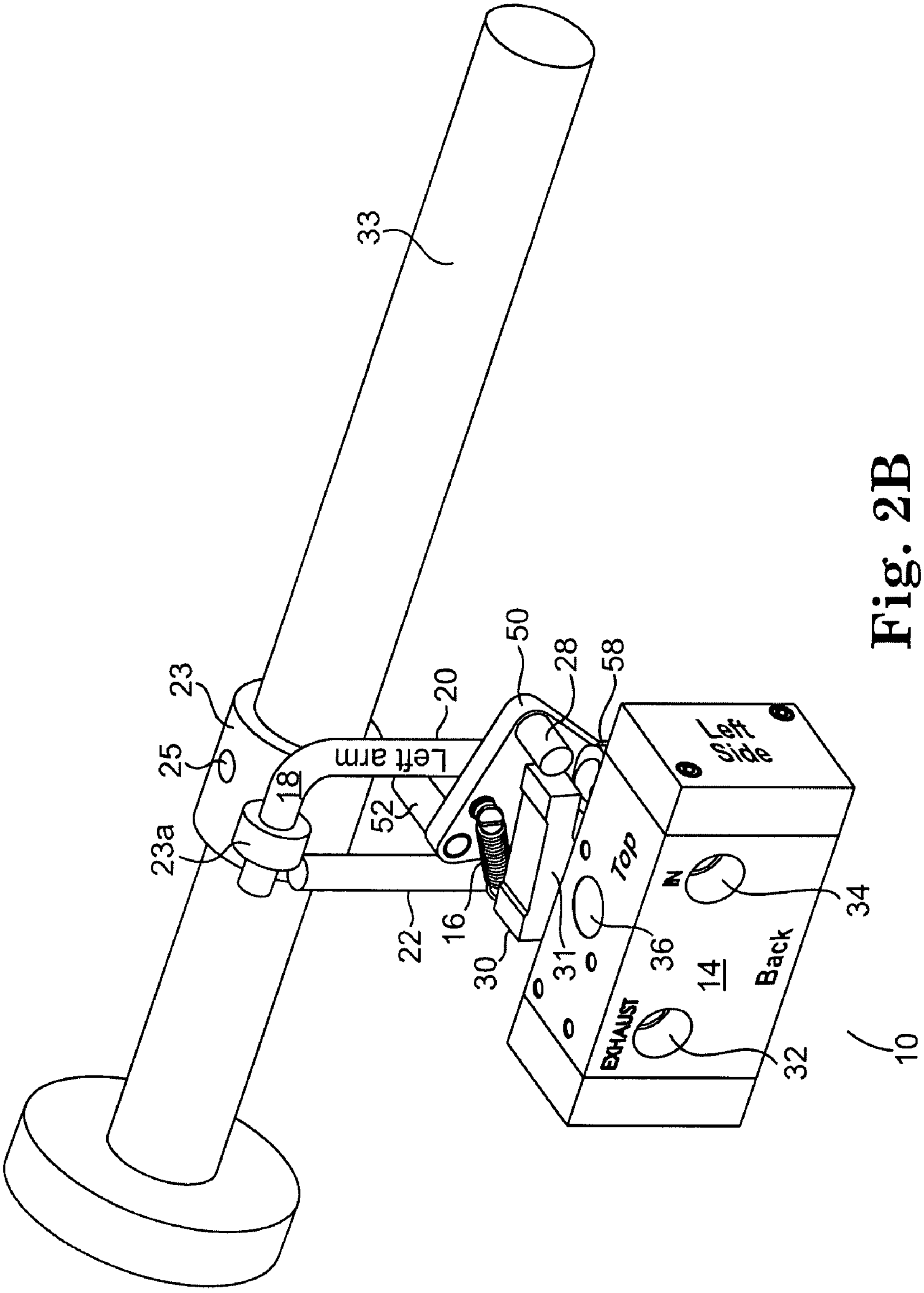
FIG. 2B is a close up view of FIG. 2A with portion of the fluid injection pump removed.

FIGS. 2A and 2B are perspective views, from the back, illustrating the interconnection of post link driver 52 with leftmost arm 20 of inverted, U-shaped link 18. Injection pumps 12 are typically gas switching systems. They have a relatively simple linkage 18, as shown in FIG. 2B, to link up with an actuator that toggles each of two switches, in turn, to change the direction of pump shaft from extension to retraction. Linkage 18 is in the form of an inverted U-shape that is mechanically coupled to a thrust rod 33. The vertical segments of the inverted U shaped linkage 18 are referred to as air pilot arms 20 and 22. Air pilot arm 20 contacts a first micro switch, or some other switching mechanism, at the end of the pump's retraction stroke, after which arm 20 contacts a second micro switch at the end of the pump's extension stroke, and the cycle automatically continues.

When the extension micro switch on existing pump 12 is toggled, a valve on pump 12 opens and allows natural gas from the wellhead to enter closed pump chamber 13. The pressurized natural gas (working gas for the switching mechanism of pump 12) acts upon diaphragm 17 (enclosed in housing 17*a*) causing it to move, as well as attached thrust rod 33, pump shaft 19, and pump plunger 15. Plunger 15 actuates fluid pump 35 (an integral part of injection pump 12) and pumps fluid (for example methanol) from methanol holding tank 42 into wellhead 40 to prevent freezing of the natural gas (the non-working gas—the user gas) when it is pumped out of wellhead 40 and into the pipeline. Movement of shaft 19 compresses a return spring 21 which acts on pump shaft 19 in a direction opposite to the force of the pressurized gas. At the end of the extension stroke, the retraction phase begins. When the retraction micro switch is toggled, a gas exhaust port on closed chamber 13 is opened to allow the pressurized gas in chamber 13 to vent to the atmosphere, and the spent working gas (the natural gas) is exhausted. Pump return spring 21, which had been compressed during the extension phase, acts concurrently with the retraction phase to retract pump plunger 15 and return diaphragm 17 to its normal static position at the start of the extension phase. And hence, one full cycle of pump 12 is completed. By the time diaphragm 17 is completely returned to its normal static position, the extension switch is again toggled and the continuous cycle begins anew.

The three-way, two position gas actuated pump control device 10 is a replacement for the existing switching valves of injection pump 12. Device 10 is designed for retro-fit in the field and as an original equipment manufacturer (OEM) add-on part for new injection pumps. A simple single point of contact between device 10 and injection pump 12 enables direct field replacement of the mechanical linkage of existing pumps with device 10, despite a variety of pump designs and manufacturers.

Detailed Construction—Exterior

Figure 3A:
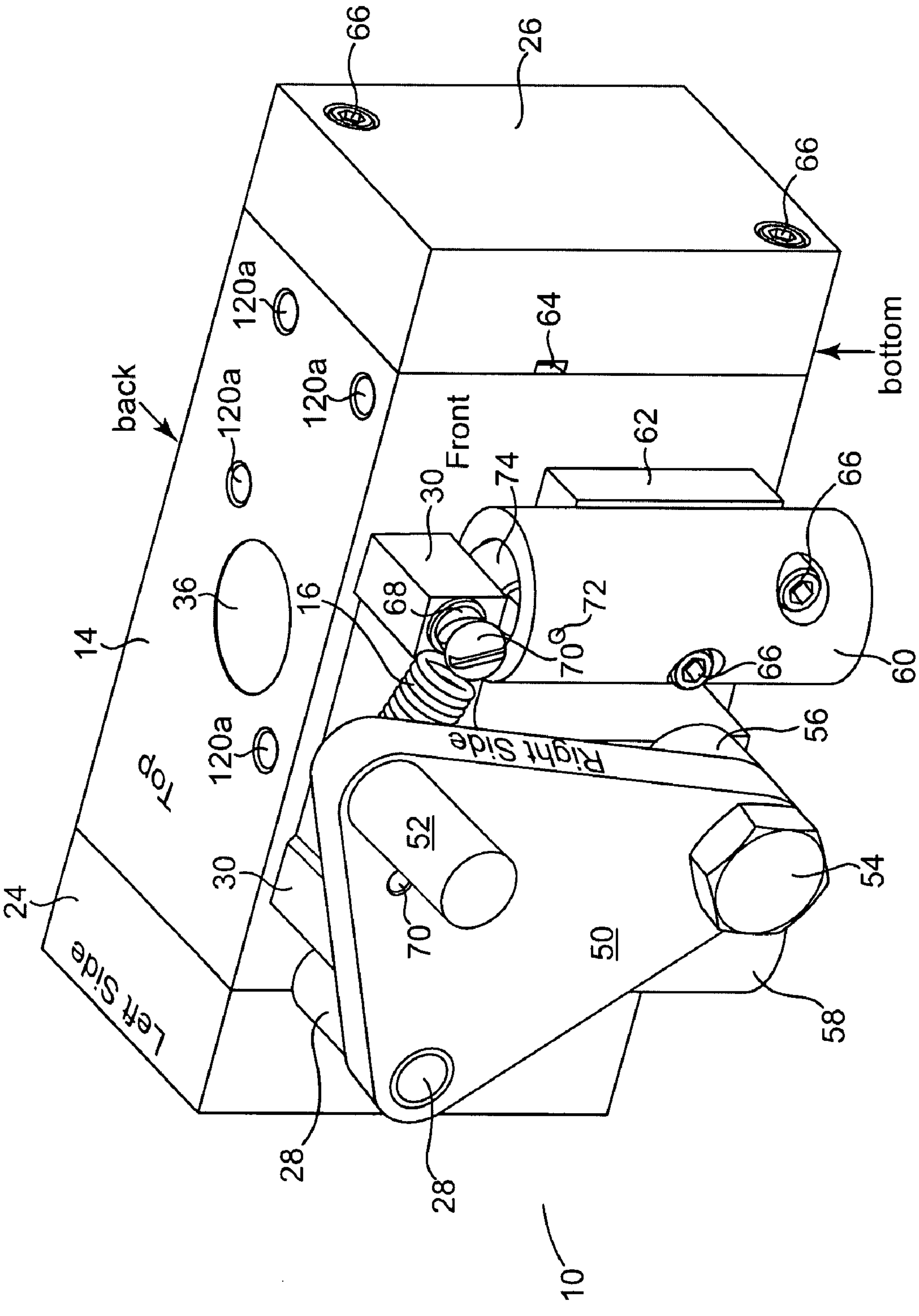
FIGS. 3A and 3B are perspective views from the front and back, respectively, of the preferred embodiment.
Figure 3B:
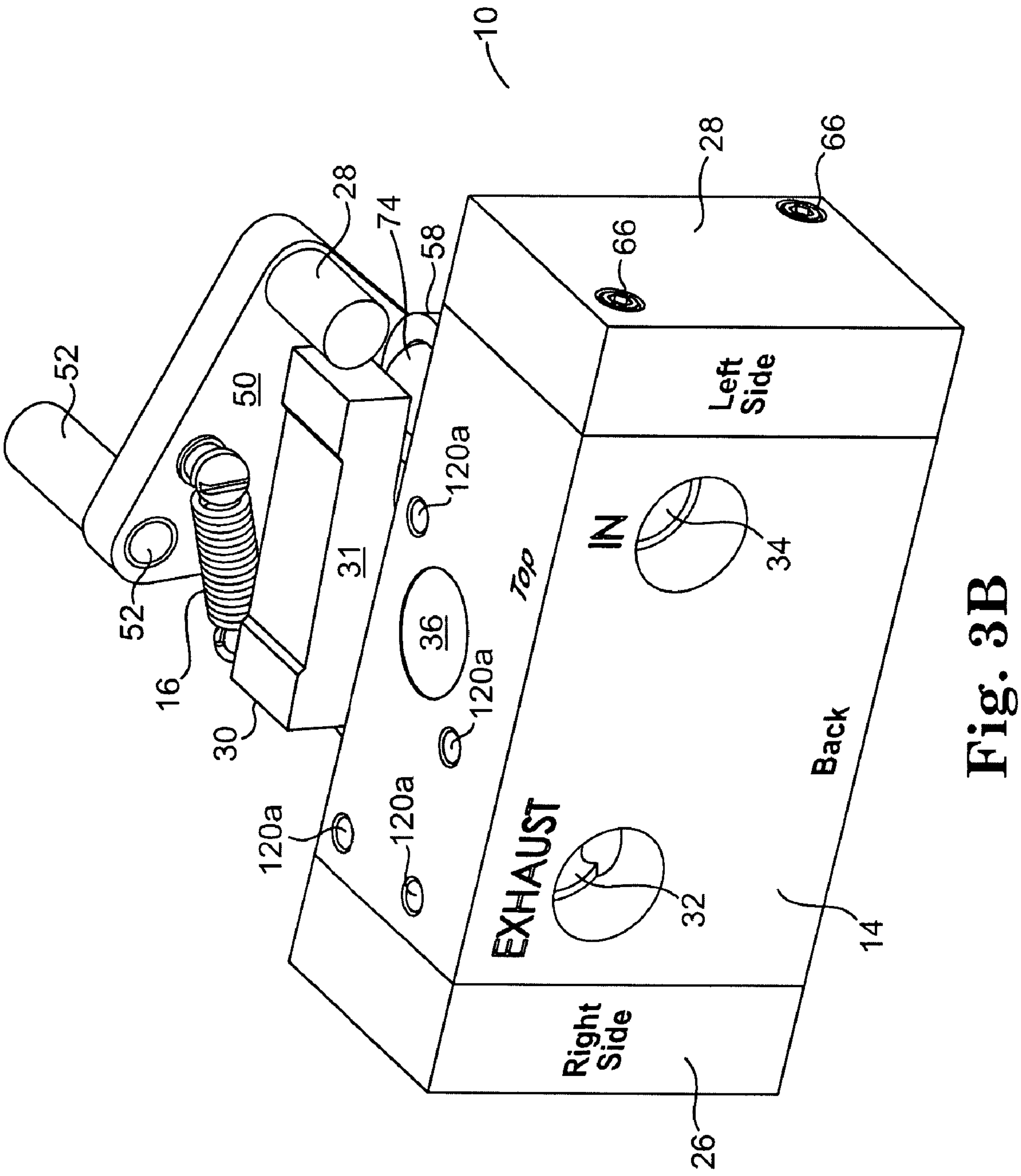

FIGS. 3A and 3B are perspective views from the front and back, respectively, of the preferred embodiment in a first valve position. In this position, pressurized working gas is directed from input port 34 through gas circuit 86 and out of working gas port 36 to pump chamber 13. Gas circuit 86 is located in main body 14 and its end caps 26 and 28. In the second valve position, input port 34 is closed and the pressurized working gas is blocked, while the gas exhausts from pump chamber 13 through gas circuit 86 and out of exhaust port 32.

In this preferred embodiment, the pump control device may be assembled in the form of left end cap 24; right end cap 26; air vent 64 (to provide ambient air pressure to piston cylinder 78*a*); and mounting boss 62, which is an integral part of main body 14. FIG. 3B is the back of device 10 and shows common exhaust port 32 for exhausting spent gas to the atmosphere and input port 34 for entry of wellhead pressure gas to device 10. Extension air pilot 60 and retraction air pilot 58 are located on the front face of main body 14. Extension air pilot 60 is on the right side and retraction air pilot 58 is on the left side. Actuation balls 74 are at the top of each air pilot 58 and 60. Post link driver 52 rides on pivot plate 50 and engages with pilot switch arms 20 and 22 of pump 12 (see also FIG. 2B).

Figure 5:
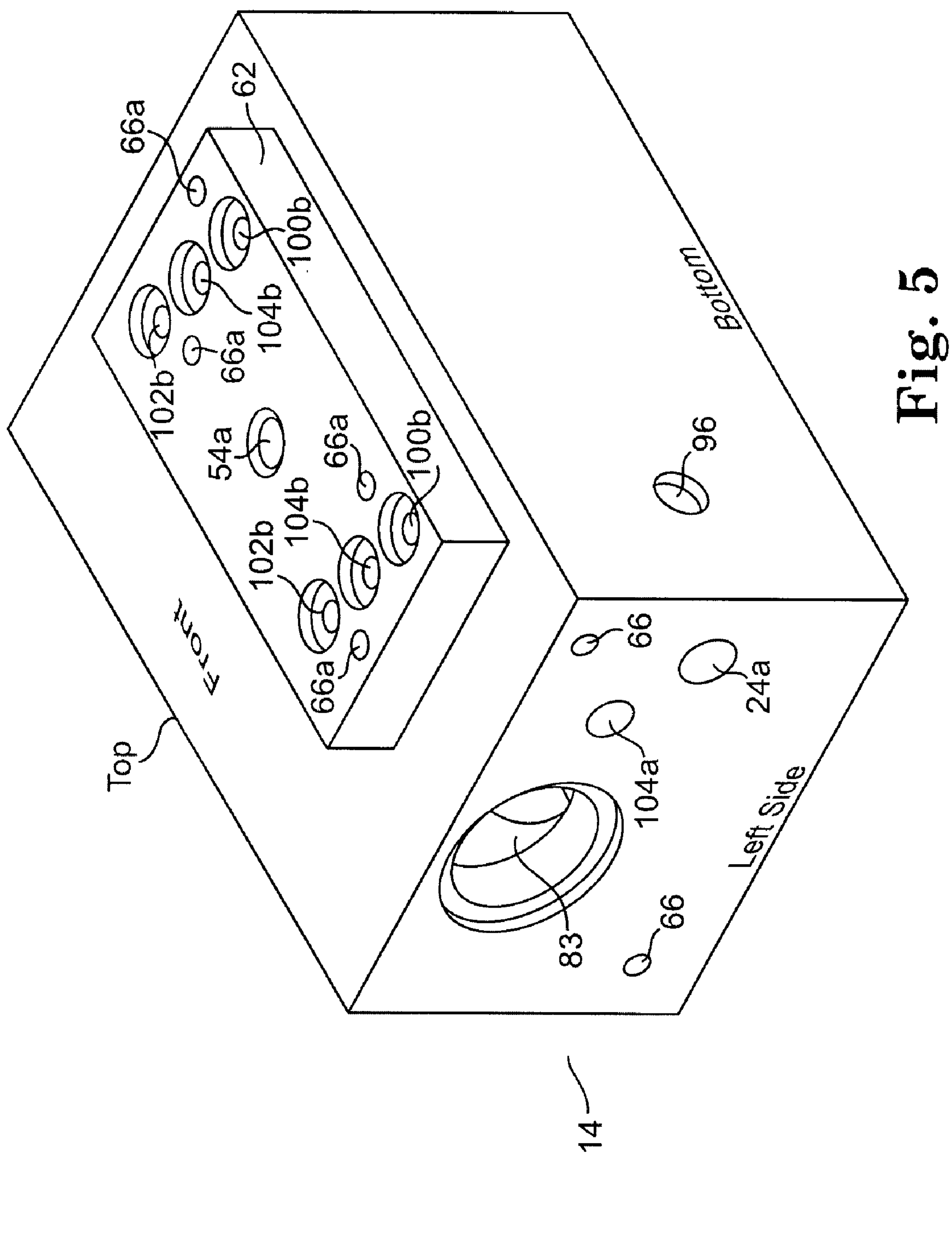
FIGS. 5-7 are perspective views of components of the preferred embodiment.

T-bar rocker 30 and pivot plate 50 are pivotally mounted to the front of main body 14 by shoulder bolt 54. Shoulder bolt 54 is the common axis of rotation for both pivot plate 50 and T-bar rocker 30. Shoulder bolt 54 is threaded into shoulder bolt hole 54*a* (FIG. 5). Pivot plate 50 imparts the necessary force (or drive) to T-bar rocker 30 to push the rocker through two phases—retraction and extension—of the control cycle of device 10.

Return post 28 rides on pivot plate 50 and is oriented towards the back of pivot plate 50 and perpendicular to it. Return post 28 engages the left side of T-bar rocker 30. Extension spring 16 provides overstroke protection for device 10 on the extension phase of device 10. End caps 26 and 28 and air pilot bodies 58 and 60 are bolted onto main body 14 with cap screws. Mounting holes 120*a* for mounting optional speed control 120 (shown in FIG. 18) are on the top of main body 14.

Counterclockwise movement (when viewing the front of device 10) of pivot plate 50 means the extension phase is in progress. Clockwise movement (when viewing the front of device 10) of pivot plate 50 means the retraction phase is in progress.

Figure 4:
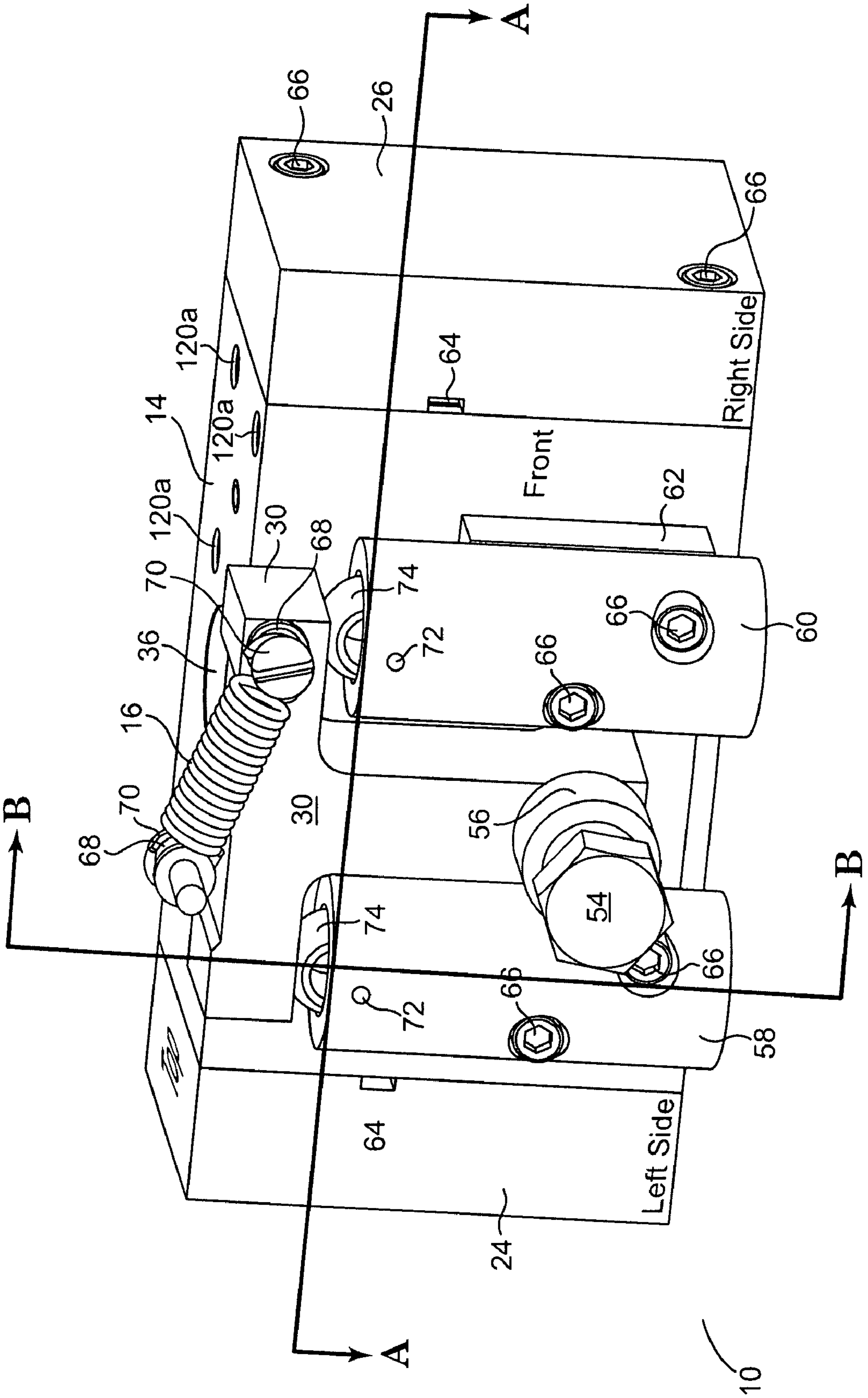
FIG. 4 is similar to FIG. 3A but with components removed for illustration.

FIG. 4 shows T-bar rocker 30 in a neutral position in contact with actuator balls 74 of air pilots 58 and 60, but not actuating air pilots 58 and 60. Automatic pump control device 10 is operated by air pilots 58 and 60 when pressurized gas is admitted into chamber 59 of one or the other air pilots 58 and 60 (see also FIGS. 14, 15, and 16). Gas is admitted into air pilot chamber 59 when actuator ball 74 is depressed by T-bar rocker 30. Pressurized gas in air pilot chamber 59 is routed through internal gas circuit 86 in main body 14 and its two end caps 24 and 26. Working gas pressure forces piston 78 against spool 82 and shifts it into either its extension or retraction position. The position will be maintained until the opposite air pilot 58 or 60 is activated and valve spool 82 is shifted into the other position.

Each air pilot 58 and 60 is equipped with a ball actuator 74. Ball 74 operates automatic pump control device 10 when it is depressed into air pilot body 76 by T-bar rocker 30. Ball 74 is depressed along the longitudinal axis of air pilot body 76. As shown in FIGS. 4, 10, 14, 15, and 16, there is a very small point of contact between T-bar rocker 30 and each of the actuator balls 74. The single point of contact design avoids sliding wear on T-bar rocker 30 and actuator ball 74. Furthermore, actuator ball 74 can rotate about its retention pin 90 in the event sideways motion is imparted to ball 74 by actuator/drive/overstroke mechanism 27. Allowing rotation also reduces ball 74 wear caused by depression of ball 74 into air pilot body 76 by T-bar rocker 30. T-bar rocker 30 is pivotally mounted to main body 14 by means of shoulder bolt 54 through the end of vertical bar 29 of T-bar rocker 30. Horizontal bar 31 of T-bar rocker 30 contacts and depresses ball actuators 74 of each air pilot 58 and 60 when horizontal bar 31 rocks from one air pilot to another.

Detailed Construction—Interior

Figure 10A:
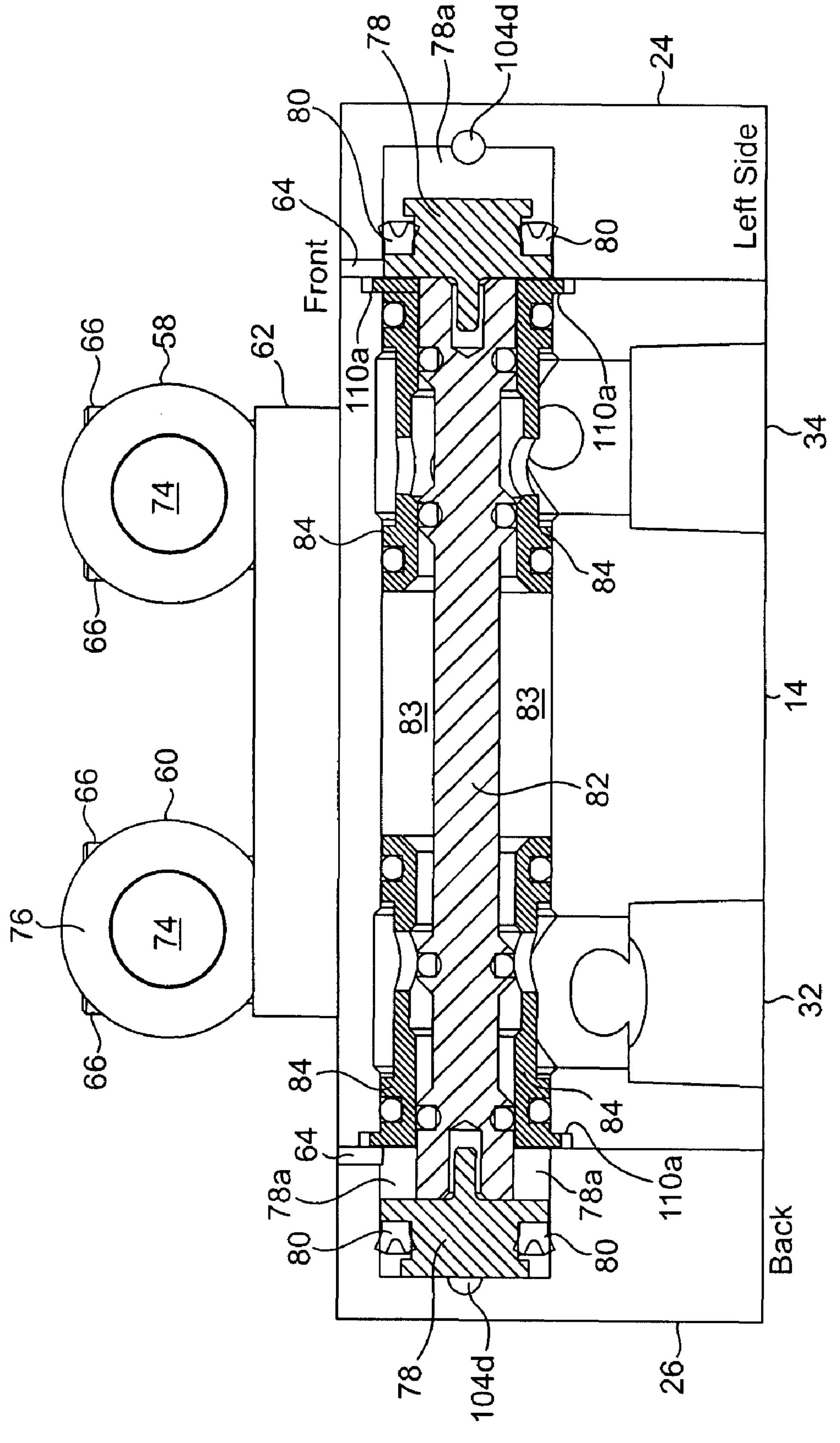
FIGS. 10A and 10B are cross sections along line A-A of FIG. 4, with FIG. 10A illustrating the retraction phase and FIG. 10B illustrating the extension phase.
Figure 14:
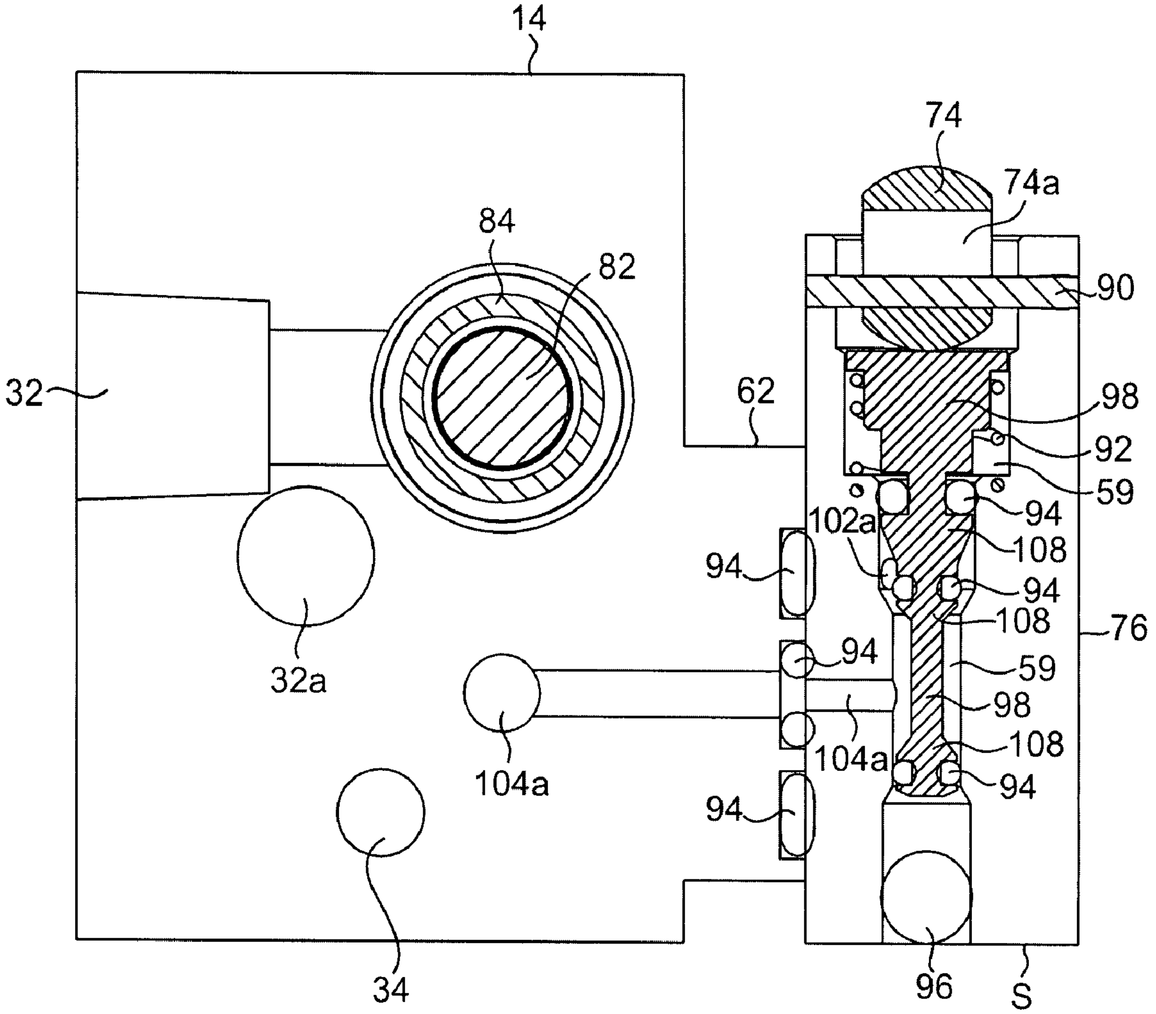
FIG. 14 is a cross section along line B-B of FIG. 4.
Figure 15:
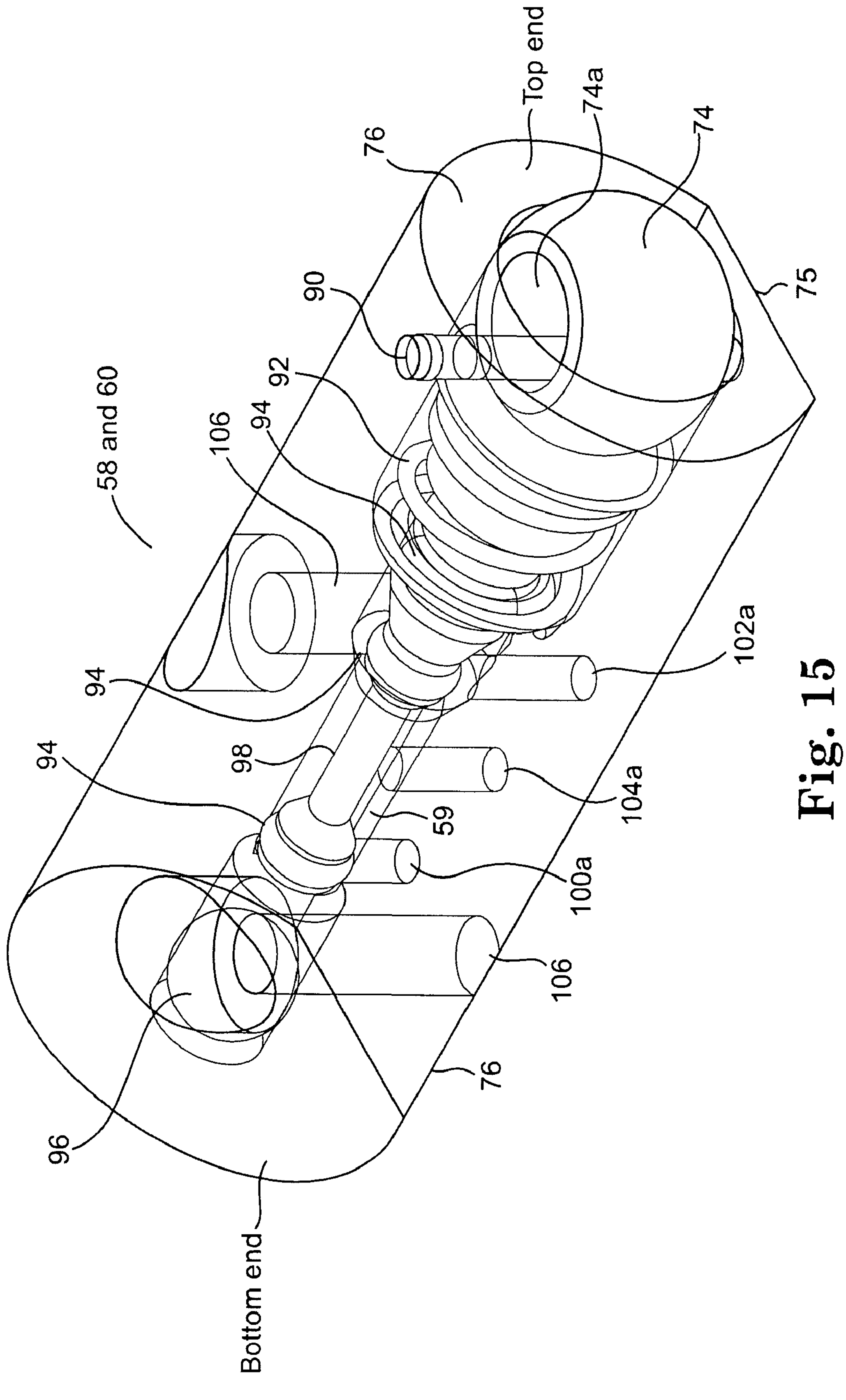
FIGS. 15 and 16 are perspective views from different angles of the preferred embodiment.
Figure 16:
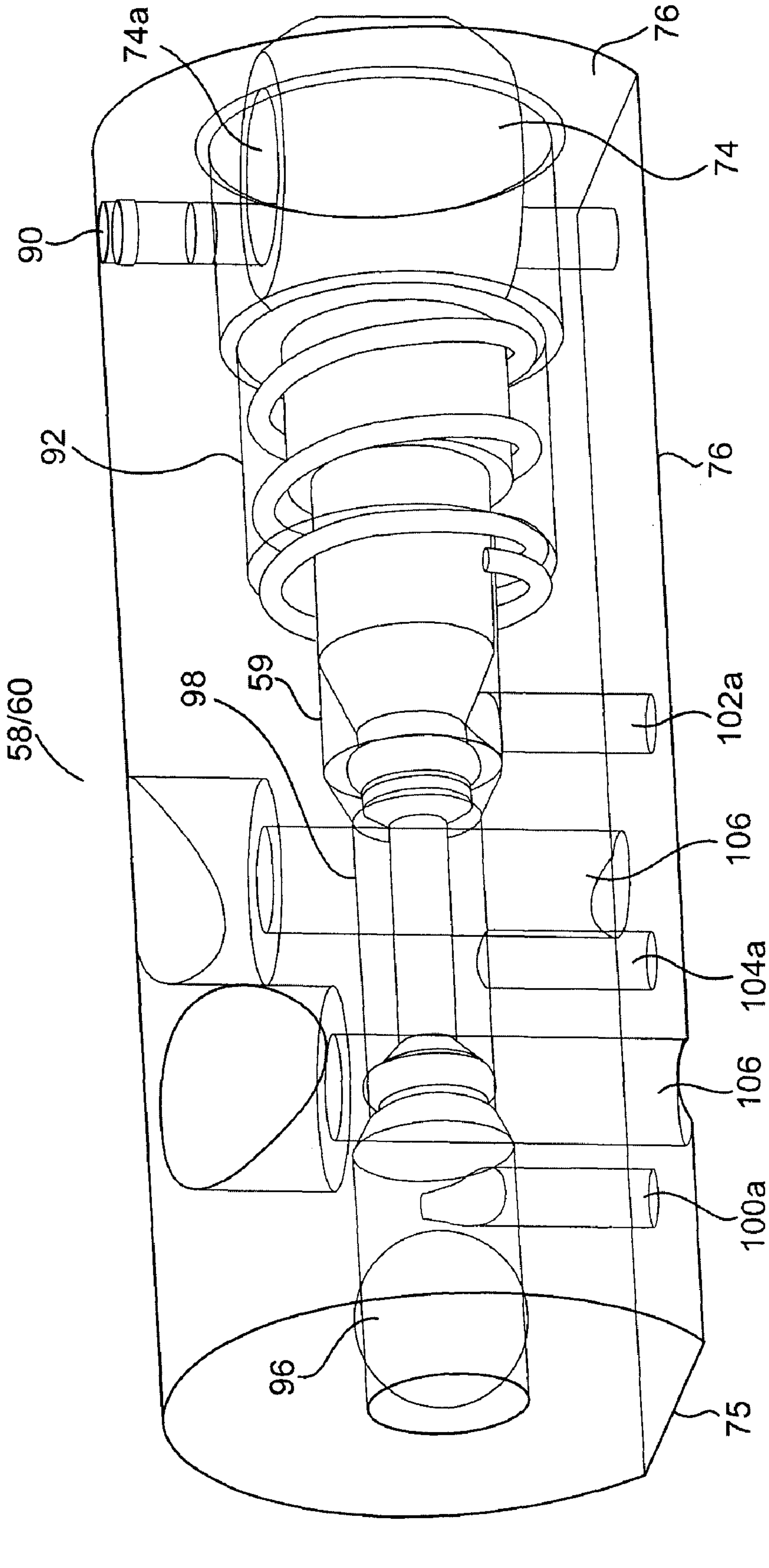

FIGS. 10A, 10B, 14, 15, and 16 illustrate various internal features of the preferred embodiment. In FIG. 10A, body 60 encases air pilot internals. Body 60 is attached to the front face of mounting boss 62 of main body 14 by two cap screws 66. Actuator ball 74 rises above the top of body 60, ready for depression by horizontal bar 31 of T-bar rocker 30. Each air pilot 58 and 60 is normally closed due to the force of return spring 92 (FIGS. 14, 15, and 16). The operation of device 10 is a function of its two valve positions and of its three separate airways. The three separate airways includes three ports and their connecting gas circuit 86 in main body 14 and its two end caps 24 and 26. The three ports are: input port 100, working port 104, and exhaust port 102. Device 10 switches from an extension to a retraction phase by switching working gas, such as natural gas, within gas circuit 86. The gas circuit begins at input port 34, which receives pressurized gas from wellhead 40. Pressurized gas travels from input port 34 to air pilot 58 or 60. The bottom of chamber 59 is closed by plug ball 96.

FIG. 5 illustrates input port 100*b*, working gas port 104*b*, and exhaust gas port 102*b* on the left side of mounting boss 62 of main body 14. The right side of mounting boss 62 also has the same series of ports 100*b*, 104*b*, and 102*b*. Each of ports 100*b*, 104*b*, and 102*b* are axially aligned with mating ports on flat side 75 of each air pilot body 60. Each mating port 100*a*, 104*a*, and 102*a* is transverse to the longitudinal axis of each air pilot chamber 59. Each mating port 100*a*, 104*a*, and 102*a* communicates with and intersects with chamber 59. Ball 74 is retained in position in air pilots 58 and 60 by retention pin 90 through pin aperture 74*a*. Retention pin 90 is transverse to the longitudinal axis of chamber 59. Ball aperture 74*a* is made larger than the diameter of pin 90 to allow full depression of ball 74 and a spherical range of motion of ball 74. When ball 74 is actuated, it moves downward in body 76 and in turn moves stem downward in chamber 59.

FIGS. 10A, 10B, 11, 12, and 13 illustrate sleeve 84, spool 82, and piston 78. A sleeve 84 is inserted into each end of the spool chamber 83 of gas circuit 86. Locating flange 110 of sleeve 84 fits firmly adjacent flange stop 110*a* and is held in place by end caps 24 and 26. O-rings 94*a* also serve the important function of sealing working gas in central portion 84*a* of sleeve 84. Each O-ring is retained within glands 108. Sleeve apertures 84*b* surround the periphery of central portion 84*a*. They allow free communication of gas between central portion 84*a* of sleeve 84 and inner wall 84*c* of sleeve 84.

Spool 82 in inserted through right and left sleeves 84. O-rings 94*b* hold spool 82 tightly in place until spool 82 is actuated by working pressure. O-rings 94*b*, however, also serve the important function of sealing working gas in central portion 82*a* of spool 82. When right or left piston 78 is actuated, working gas pressure overcomes the tight fit of O-rings 94*b*, thereby moving spool 82 from left to right, or right to left as the case may be, within sleeves 84. O-rings 94*b* of spool 82 are seated on inner walls 84*c* of sleeves 84. Each O-ring is retained within glands 108. When spool 82 is in a first or second position within chamber 83, one of the ends 85 of spool 82 is extended outside of the end of a sleeve 84, but not so far that O-ring 94*b* is so extended. The other end 85 of spool 82 is flush with the end of a sleeve 84. When working gas is allowed to act on piston 78, the piston moves the extended end 85 of spool 82 into a flush position with the end of a sleeve 84 and simultaneously extends the flush end of spool 82 outside of sleeve 84, but not so far that O-ring 94*b* is so extended. Sleeve apertures 84*b*, which surround the periphery of central portion 84A of sleeve 84, allow free communication of gas between central portion 84*a* of sleeve 84 and side portions 82*b* of spool 82. They serve the purpose of equalizing the gas pressure between the top of piston 78 and side portion 82*b*.

Figure 6:
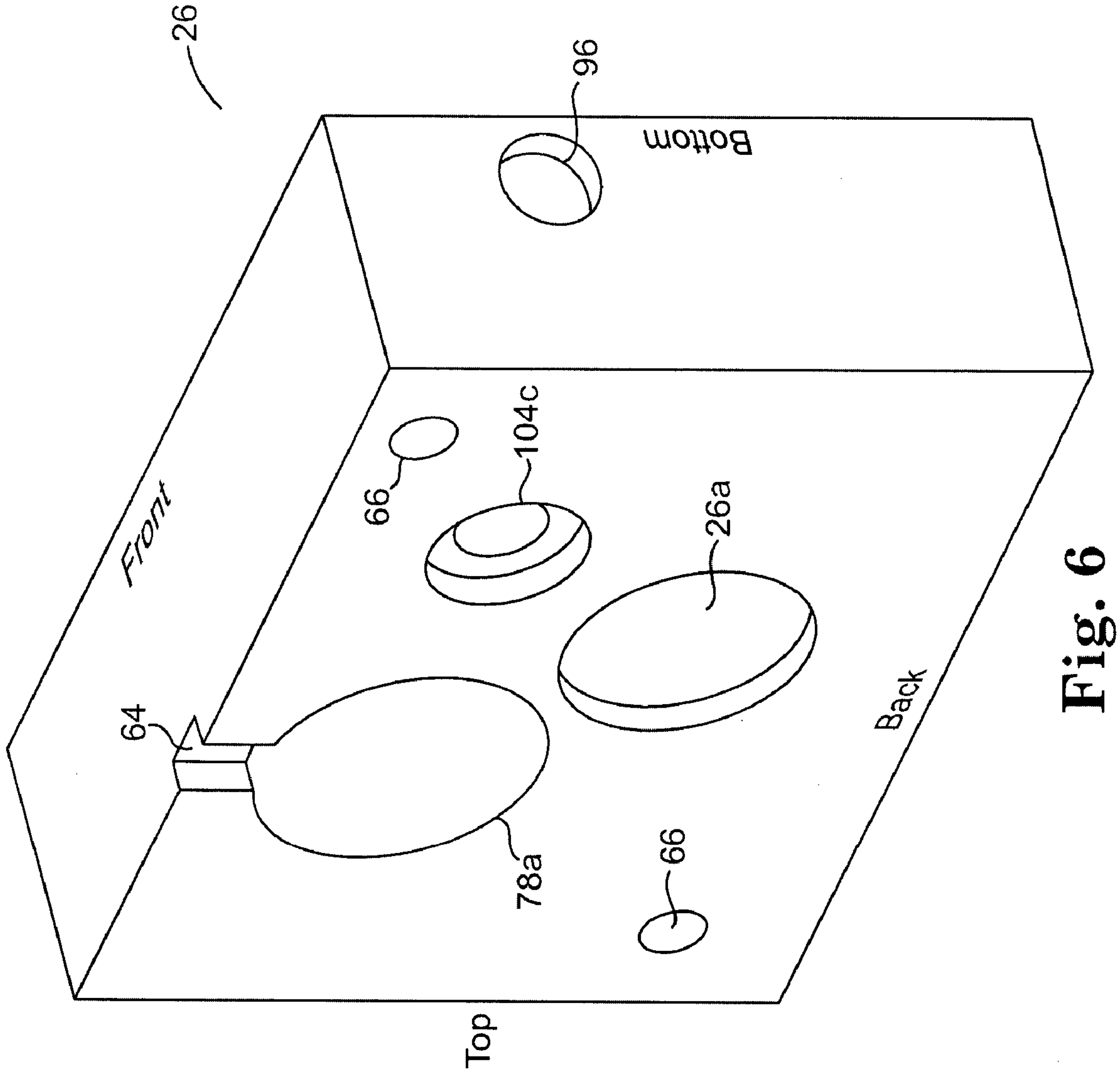
Figure 7:
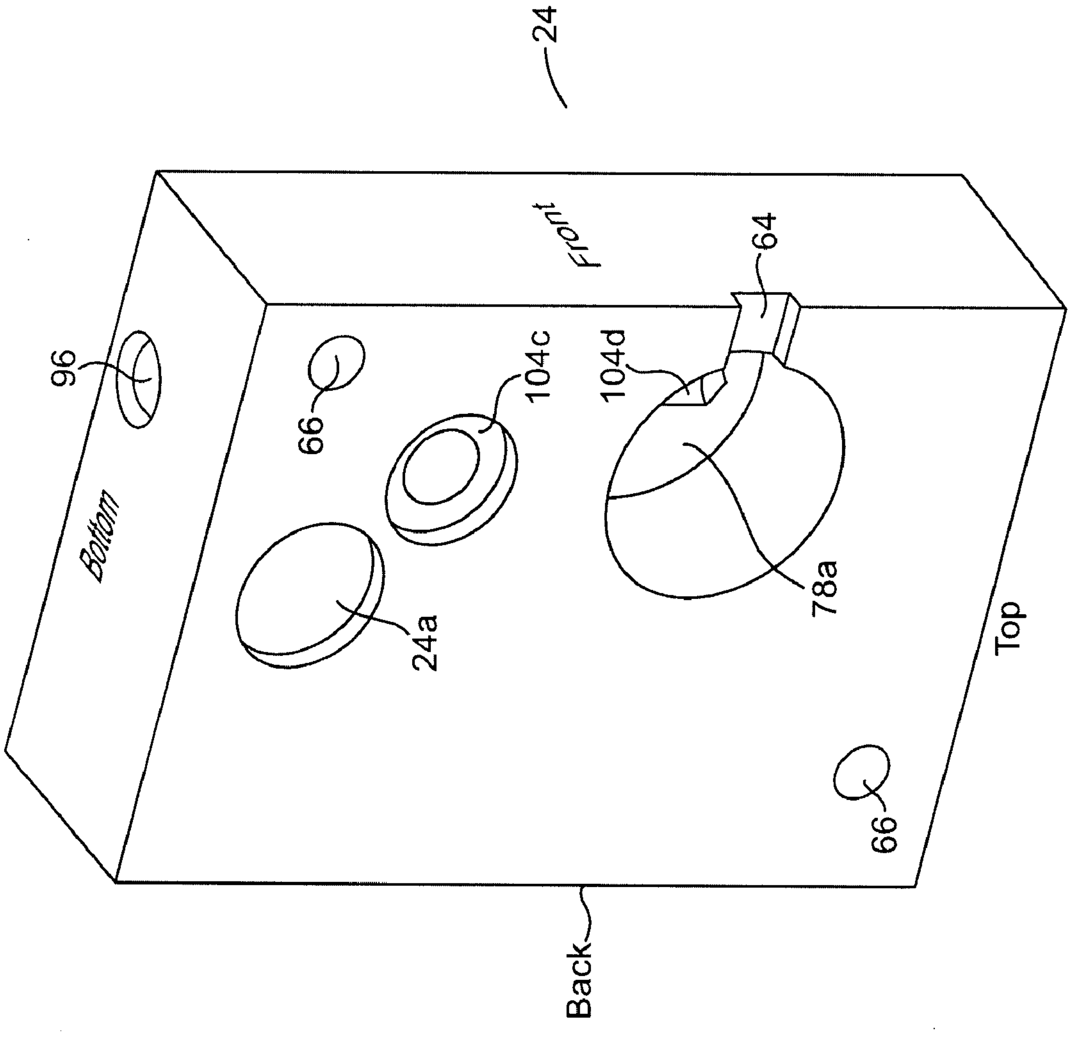
Figure 8:
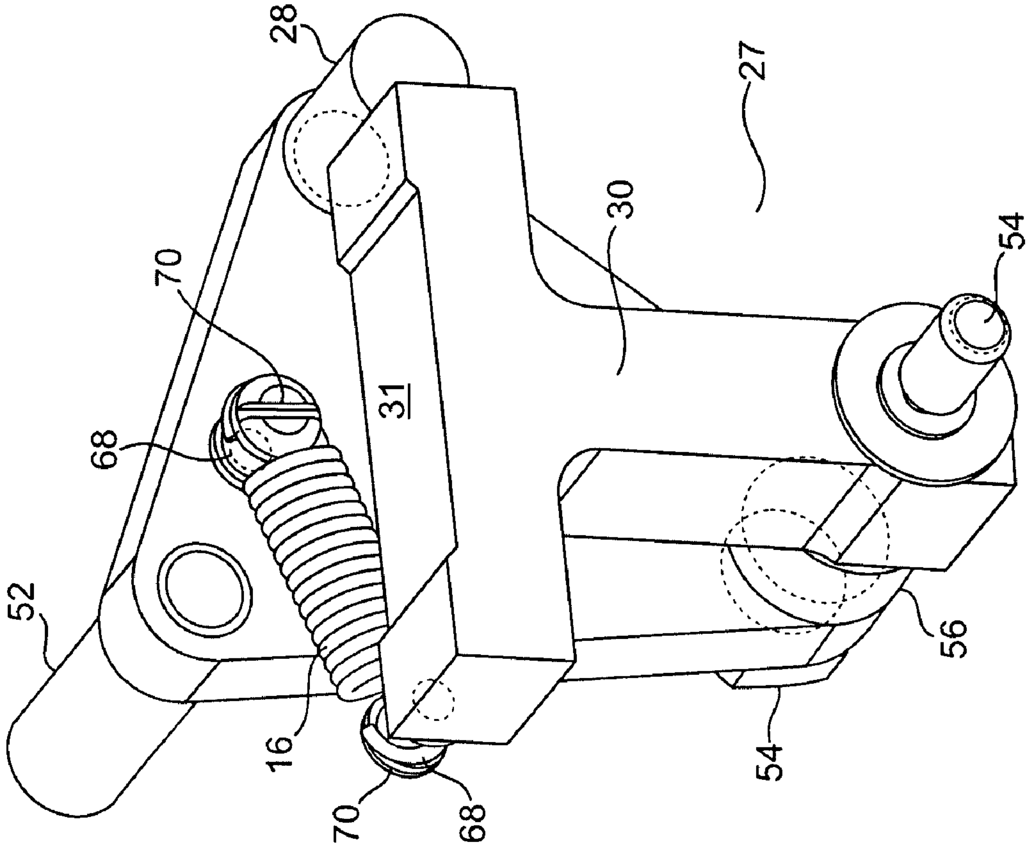
FIGS. 8 and 9 are perspective back and front views, respectively, of a preferred embodiment of an actuator/drive/overstroke mechanism.
Figure 9:
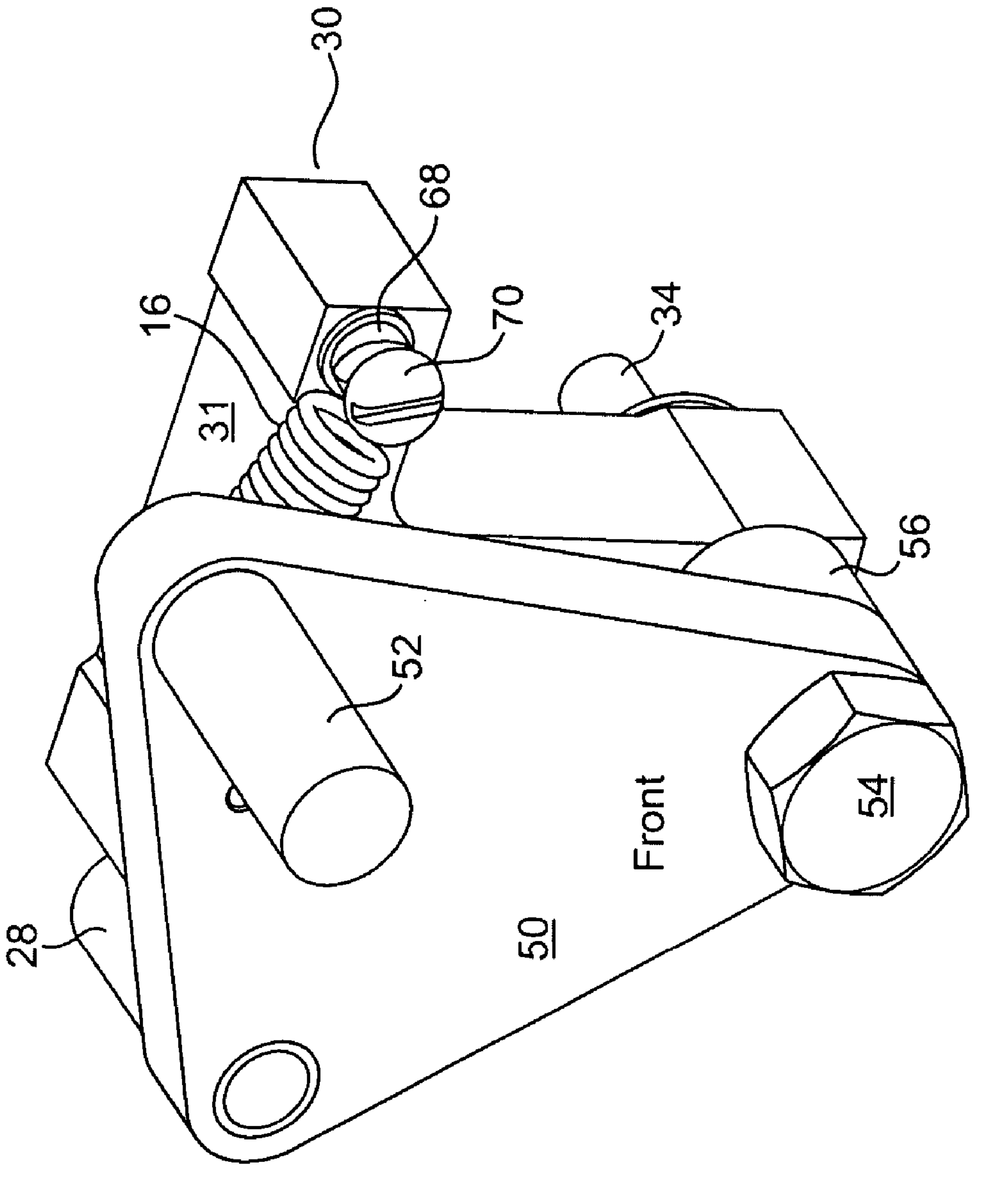
Figure 13:
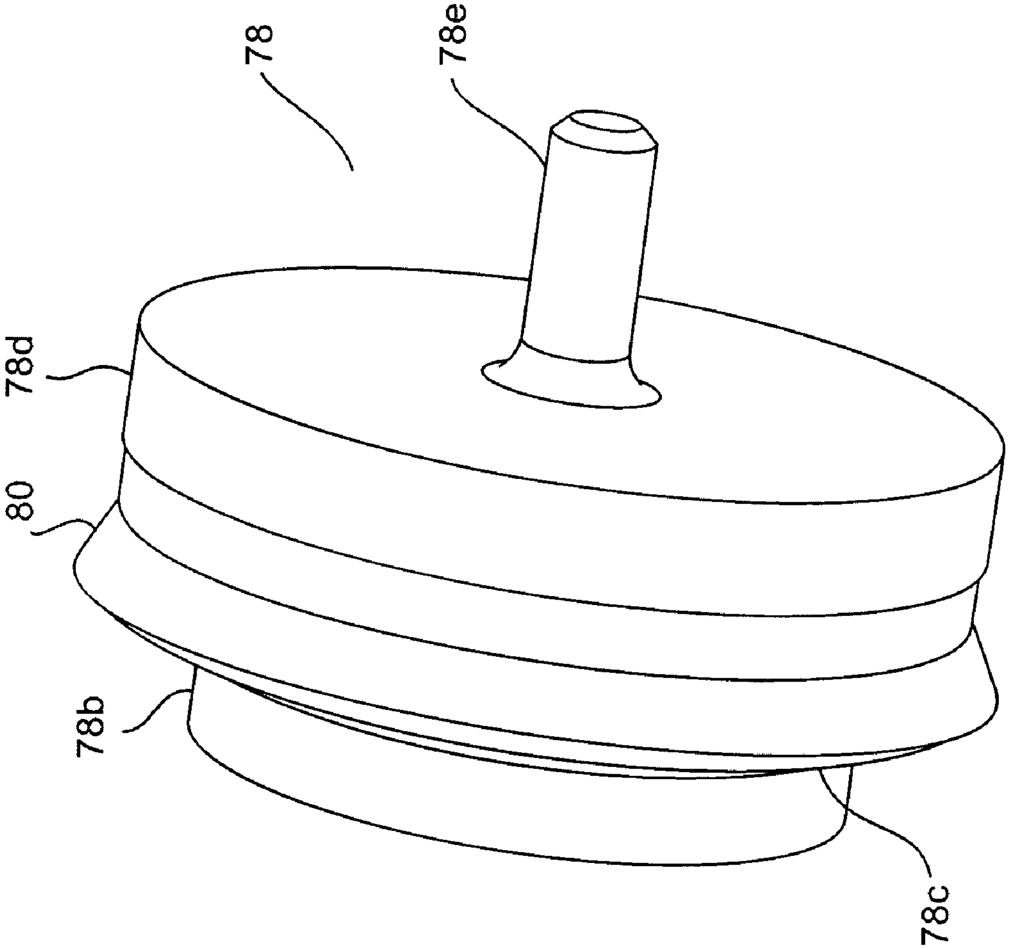

Piston 78 rides in piston cylinder 78*a*. There is a piston cylinder 78*a* in each of end caps 24 and 26. Working gas pressure is delivered to piston cylinder 78*a* through working gas port 104*d*, which can be seen in FIG. 7, the left end cap 24. The right end cap 26 also has a gas port 104*d*, but it cannot be seen in FIG. 6, the right end cap 26. Working pressure delivered to the top of piston 78 drives the piston against the end 85 of spool 82 and moves spool 82 flush with the left side of main body 14, as shown in FIG. 10A. In this position device 10 is in its retraction phase. As shown on the right side of device 10, piston 78 is retracted all the way into piston cylinder 78*a*. Working pressure ports 104*d* can be seen at the end of each cylinder in FIGS. 10A-B. FIG. 13 illustrates piston 78. Piston 78 is comprised of the following integral regions: drive end region 78*b*; U-cup retainer region 78*c*; top end region 78*d*; and alignment nipple region 78*d*. U-cup ring 80 is retained on U-cup retainer region 78*c* between drive end region 78*b* and top end region 78*d*. U-cup 80 was chosen rather than an O-ring because U-cup 80 creates a better and longer seal between piston 78 and piston cylinder 78*b*. When top end 78*d* is driven against top end 85 of spool 82, alignment nipple 78*e* inserts into alignment nipple receiver 112 to arrest excess lateral tipping movement of piston 78 as it moves along piston cylinder 78*a*.

Gas circuit 86 resides primarily in main body 14, end caps 24 and 26, and air pilots 58 and 60. But gas circuit 86 also includes pressurized gas line 48 from well head 40 to device 10 and pump natural gas line 45 from methanol pump 12 to device 10 (FIG. 1). In the inactivated, or normal, position of air pilot 58 or 60, input pressure at input port 100*a* is blocked and any pressure at the working gas port 104*a* passes through and out the exhaust port 102*a*. The internal gas circuit passages 86 also direct pressurized gas from input port 34 to input port 100*a* of air pilots 58 or 60, as well as from the exhaust port 102*a* of air pilots 58 or 60 to exhaust port 32. Thus all of the gas used by pump 12 is captured and directed out a single port.

Figure 10B:
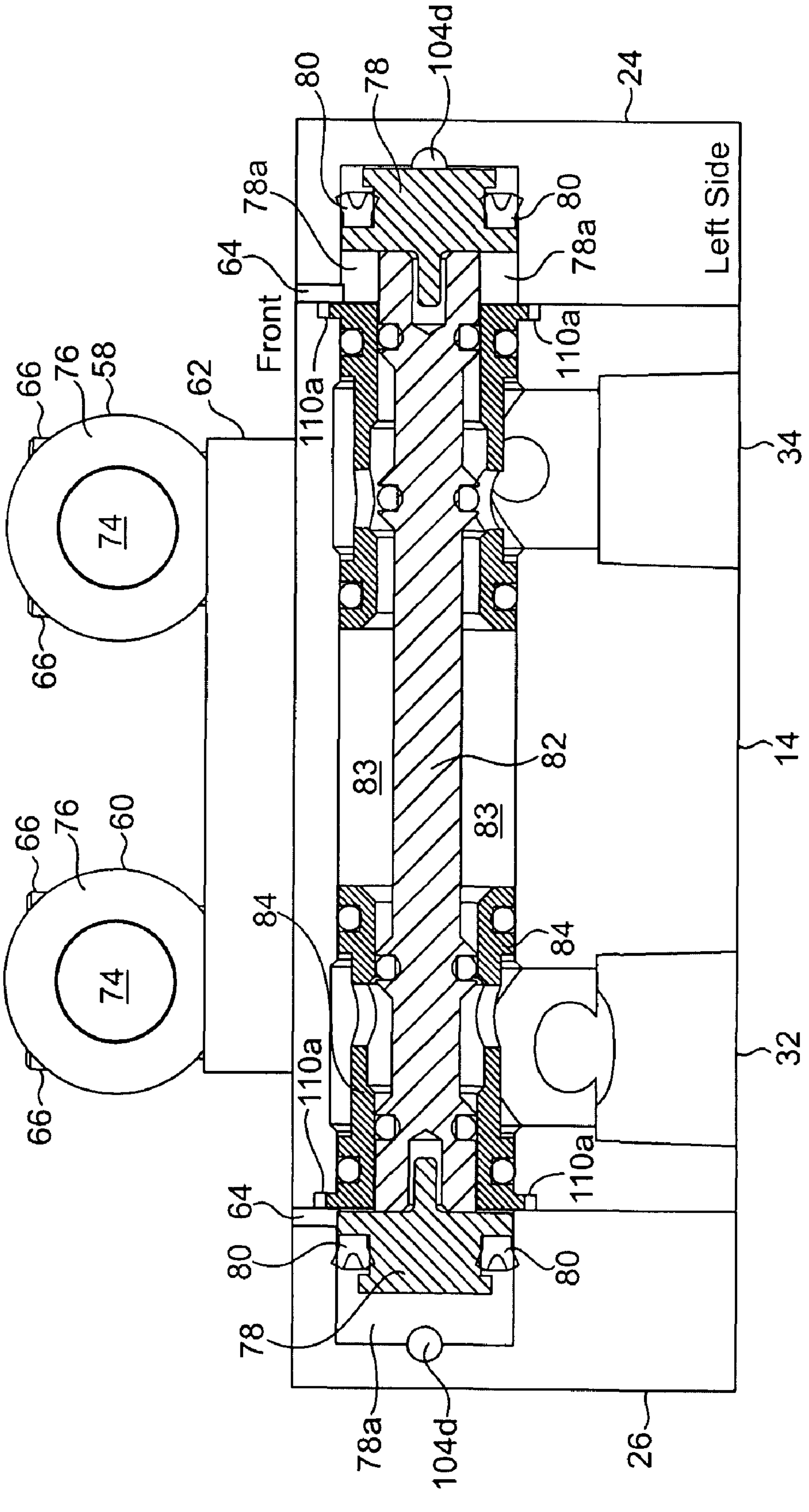
Figure 11:
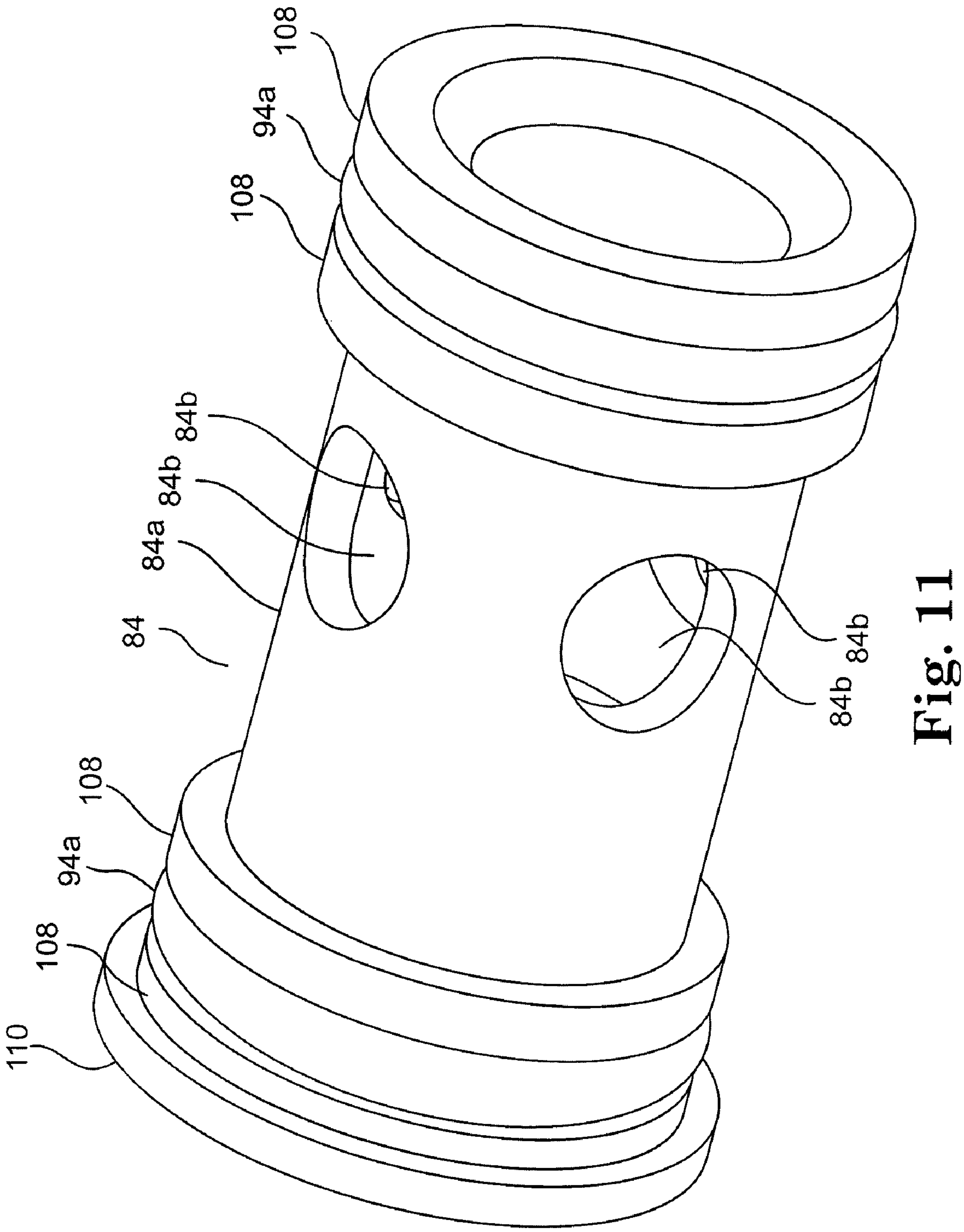
FIGS. 11-13 are perspective views of components of the preferred embodiment.
Figure 12:
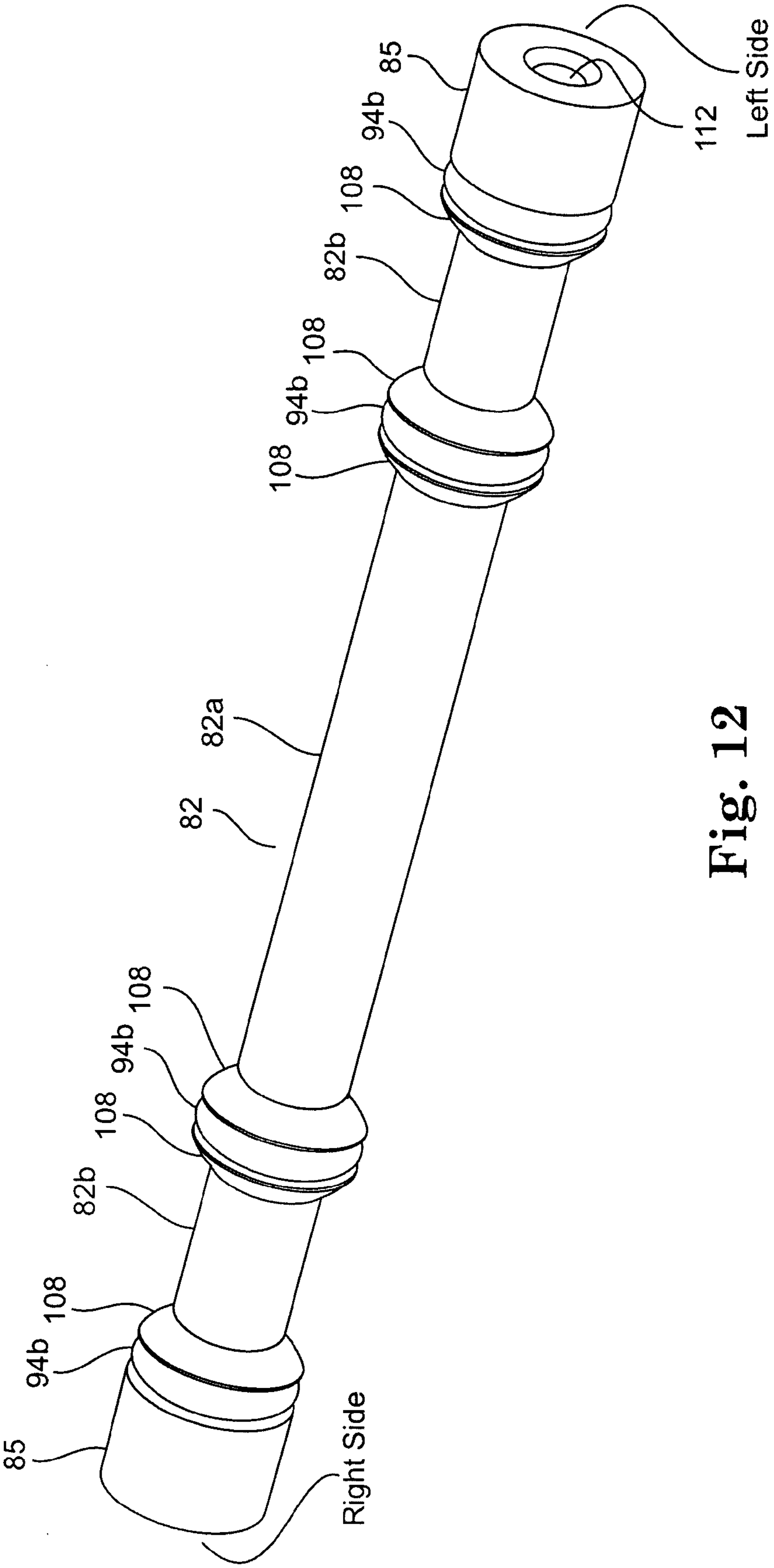

When extension air pilot 60 is actuated (FIGS. 15 and 16), exhaust port 102*a* is closed and pressure at input port 100*a* passes through and out the working gas port 104*a*. Working gas in air pilot chamber 59 is pulsed due to downward movement of ball 74 and stem 98. The pulse of working gas pressure is transmitted from air pilot 60 into piston circuit 86*a* of gas circuit 86 at working gas port 104*b*, located on mounting boss 62, at end cap port 104*c*, in right end cap 26, at piston cylinder port 104*d*, in right end cap 26, and at piston cylinder 78*a*. The gas pulse drives piston 78, within cylinder 78*a*, into contact with spool 82, which moves the spool longitudinally into a flush position with the right side of main body 14 (FIG. 10B). The spent pulse of natural working gas used to drive piston 78 is evacuated through right air vent 64 to atmosphere. The evacuated gas pulse is a tiny volume of gas. Both air pilots 58 and 60 have their own piston circuits 86*a*. While the right end of spool 82 is flush with the right side of main body 14, the left end of spool 82 protrudes into cylinder 78*a* on the left side of main body 14. High pressure natural gas from wellhead 40 at input port 34 flows through input port 34, through apertures 84*b* in left sleeve 84, around central portion 84*a* of sleeve 84, into central spool chamber 83, out working gas port 36, and through line 45 to methanol pump 12, where working gas actuates diaphragm 17 and extends shaft 19 of pump and pumps methanol down the wellhead 40.

When retraction air pilot 58 is actuated (FIGS. 15 and 16) exhaust port 102*a* is closed and pressure at input port 100*a* passes through and out the working gas port 104*a*. Working gas in air pilot chamber 59 is pulsed due to downward movement of ball 74 and stem 98. The pulse of working gas pressure is transmitted from air pilot 58 into piston circuit 86*a* of gas circuit 86 at working gas port 104*b*, located on mounting boss 62, at end cap port 104*c*, in left end cap 24, at piston cylinder port 104*d*, in left end cap 24, and at piston cylinder 78*a*. The gas pulse drives piston 78, within cylinder 78*a*, into contact with spool 82, which moves the spool longitudinally into a flush position with the left side of main body 14 (FIG. 10B). The spent pulse of natural working gas used to drive piston 78 is evacuated through left side air vent 64 to atmosphere. The evacuated gas pulse is a tiny volume of gas. Both air pilots 58 and 60 have their own piston circuits 86*a*. While the left end of spool 82 is flush with the left side of main body 14, the right end of spool 82 protrudes into cylinder 78*a* on the right side of main body 14. High pressure natural gas from wellhead 40 at input port 34 ceases to flow through apertures 84*b* in left sleeve 84, around central portion 84*a* of sleeve 84, into central spool chamber 83 because spool 82 and O-ring 94*b* moved to the left and O-ring cut-off flow of working gas into central portion 82*a*. Concurrently with cut-off of working gas flow, natural gas that was deflecting diaphragm 17 is able to back-flow into working gas line 45 through working gas port 36, into central spool chamber 83, around central portion 84*a* of sleeve 84, through apertures 84*b* in right sleeve 84, and out of exhaust port 32 to the atmosphere.

Figure 17A:
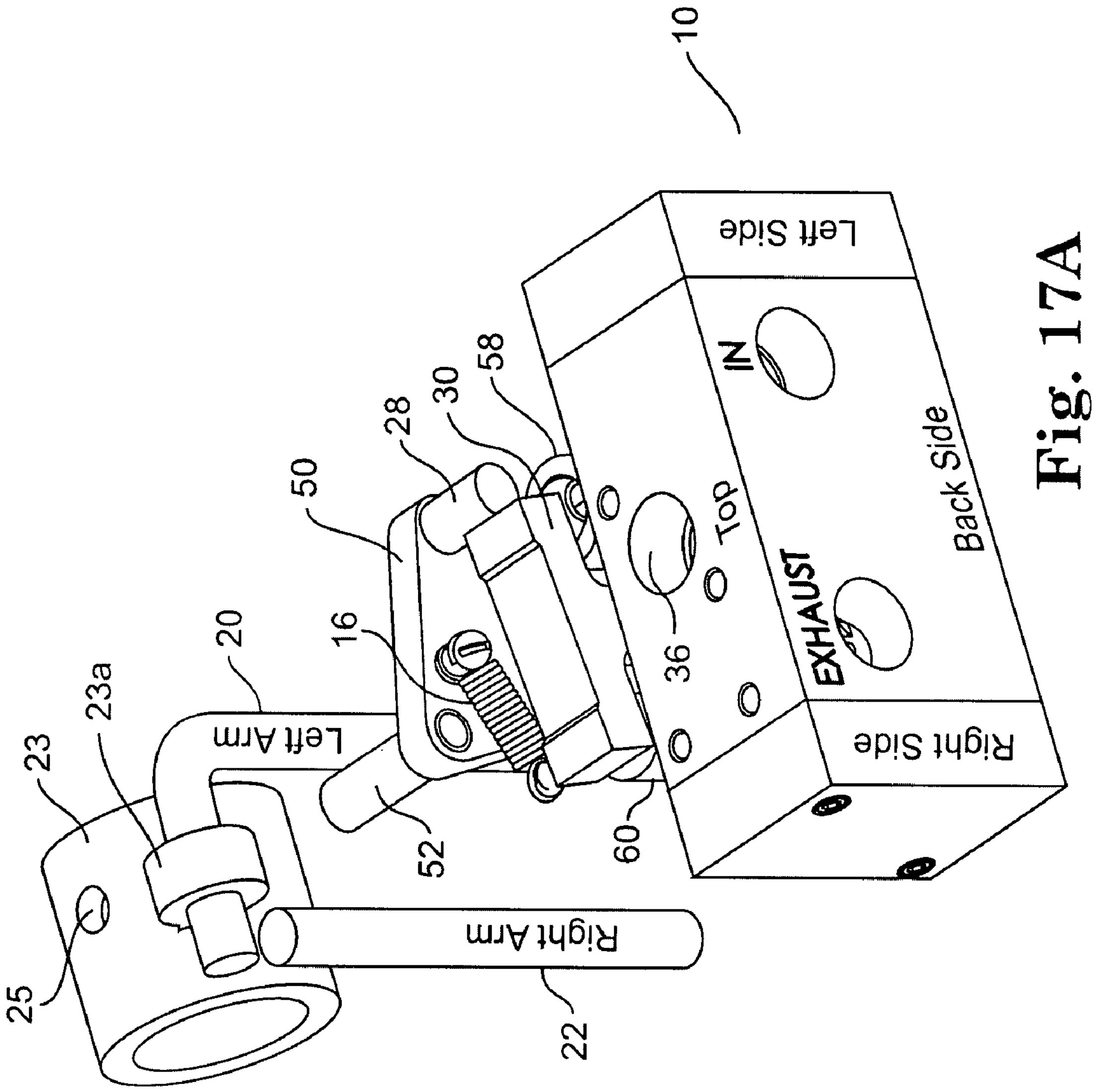
FIGS. 17A-D are perspective views of the preferred embodiment in various phases of operation.
Figure 17B:
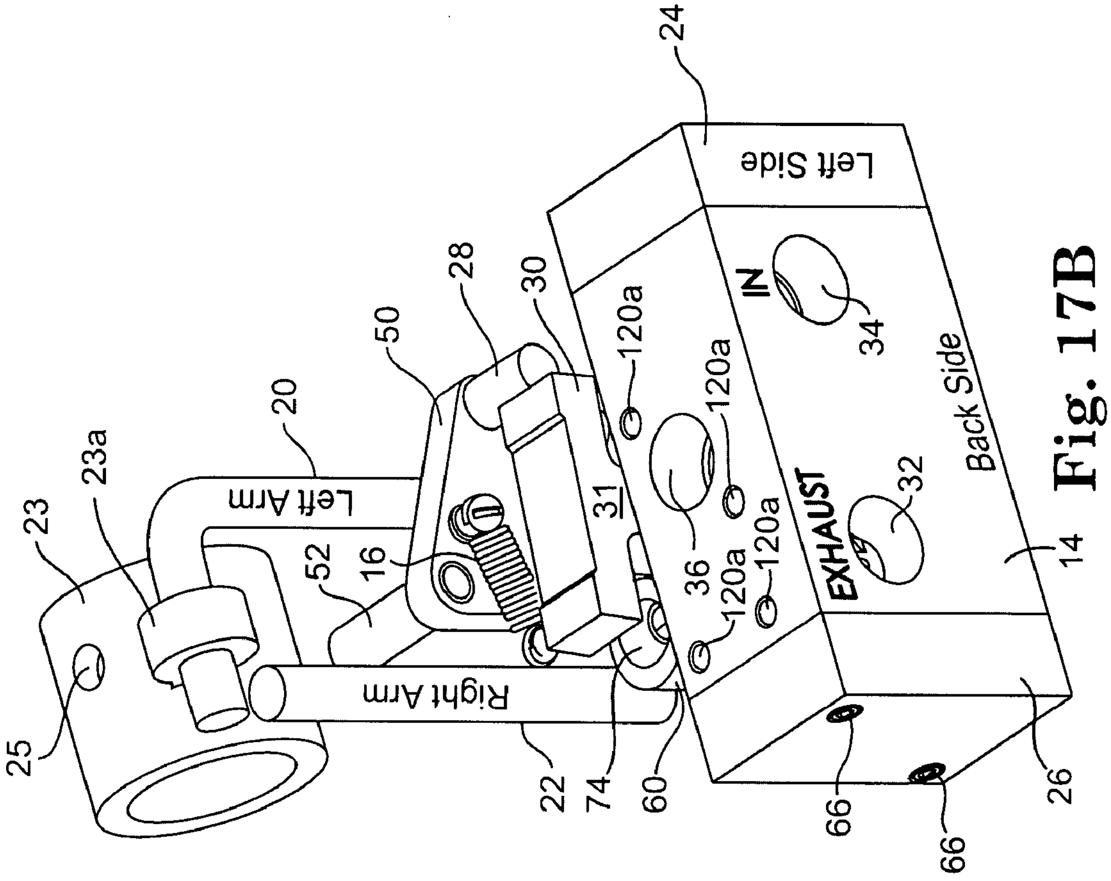
Figure 17C:
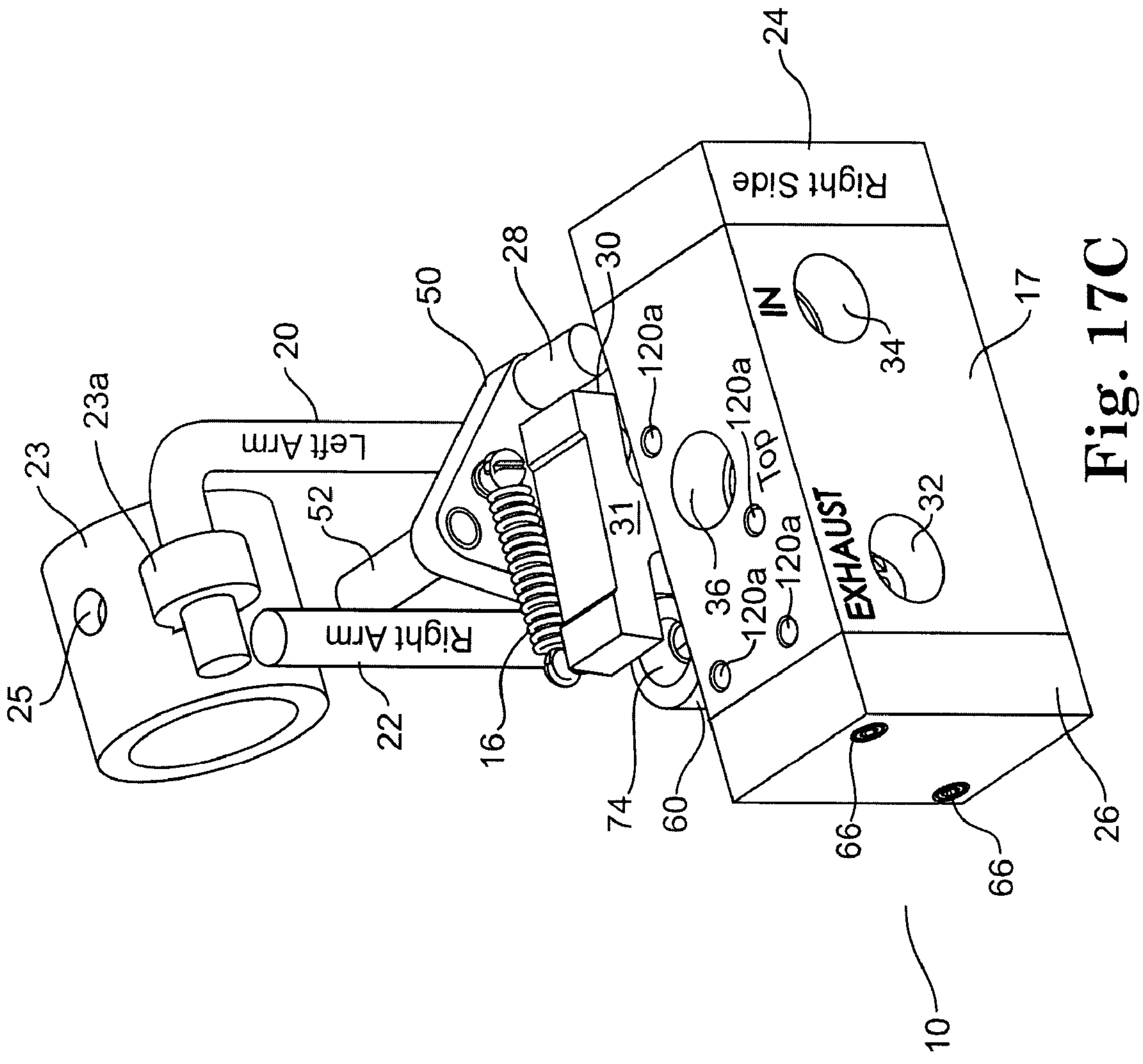
Figure 17D:
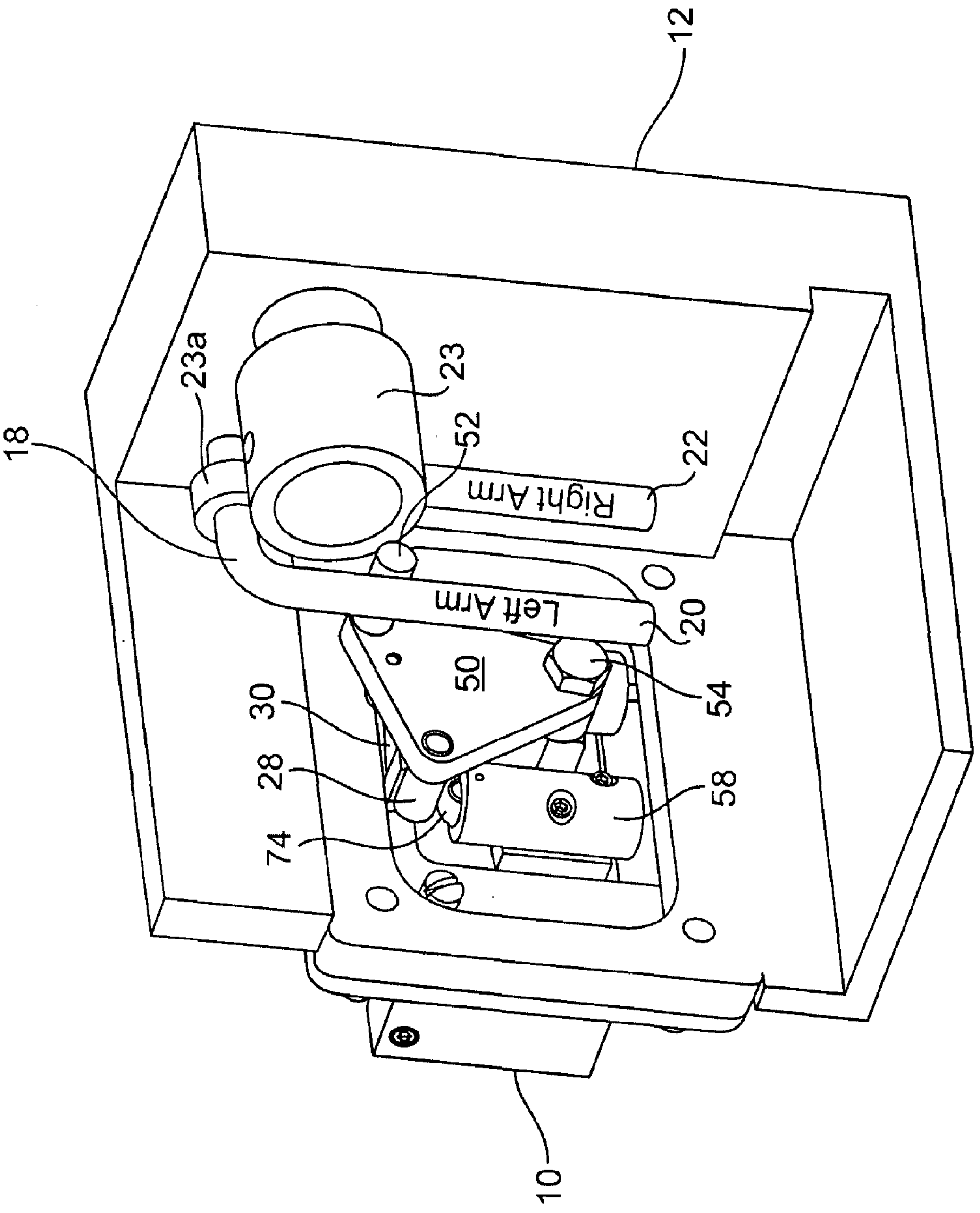

There are two mounting points for attachment of extension spring 16. The first attachment point is located proximate to the upper side of pivot plate 50 to the left of a post link drive 52. The attachment point of second extension spring 16 is located on the right side of the horizontal bar of T-bar rocker 30. Therefore, as shown in the series of FIGS. 17A-B, when pivot plate 50 of actuator/drive/overstroke mechanism 27 is rotated from its initial extension position in FIG. 17A counterclockwise to its retraction position, extension spring 16 pulls T-bar rocker 30 along with it. Extension spring 16 provides a margin of safety for actuator/drive/overstroke mechanism 27 if, after retraction air pilot 58 has been actuated, pump 12 fails to reverse its direction from its extension stroke to its retraction stroke. With the overstroke mechanism, pump 12 can overstroke past actuator ball 74 of retraction air pilot 58 and reach its dead-stop point without destroying automatic pump control device 10. Clockwise rotation of T-bar rocker 30 is imparted by post link driver 52 at the top of triangular pivot plate 50. Return post 28 extends in a backward direction from pivot plate drive 50. It is located near T-bar rocker 30 proximate to the leftmost end of horizontal bar 31 of T-bar rocker 30. Return post 28 is normally held in contact with T-bar rocker 30 by the tension force of extension spring 16. It is only during an occurrence of pump overstroke that return post 28 brakes contact with T-bar rocker 30. In addition to its overstroke aspect, return post 28 functions to drive T-bar rocker 30 clockwise after the retract phase of pump 12. FIG. 17C illustrates device 10 and pump 12 in an overstroke condition. Prior to overstroke, post link driver 52 is in contact with leftmost air pilot switch arm 20 and extension air pilot switch 60 is actuated. In FIG. 17B, post link driver 52 is in contact with rightmost air pilot switch arm 22 and retention air pilot switch 60 is actuated. FIG. 17C, illustrates device 10 and pump 12 in the overstroke condition. In FIG. 17C as opposed to FIG. 17B, rocker arm 30 is no longer in contact with return post 28. And horizontal bar 31 remains on ball 74 of retraction air pilot 58 maintaining device 10 in retraction phase and yet allowing post link driver 52 to move with rightmost arm 22. Continued travel of rightmost arm 22 is initially halted due to extension spring force 16 pulling pivot plate 50 back into contact with horizontal bar 31. Continued travel of rightmost arm 22 is further halted due to the fact that device 10 remains in retraction phase, thereby allowing working gas to exhaust from diaghram and return to its neutral position. Where it not for the continued actuation of retraction ball 74, pump 12 would hang-up and stop and device 10 would most likely be damaged.

Overstroke Protection

The force of high gas pressure of wellhead 40 that is applied by pump 12 to device 10 is limited by extension spring 16. Spring 16 prevents damage to device 10 in an overstroke situation. An overstroke condition occurs when the control valve of existing pumps 12 does not respond quickly enough to a signal from the system to reverse direction. Pump shaft 19 continues to extend past the physical limit of the control valve, damages the control valve, results in immediate failure of the control valve. These failures are common on existing pumps. Hesitation of the control valve to respond a signal from the system in a normal timely fashion can be caused by blockage of the exhaust path or just be a one in a million occurrence that the control valve is slow. The device described in this application is not affected by overstroke.

In the preferred embodiment, the source of the rocking motion imparted to actuator/drive/overstroke mechanism 27 is the reciprocation of pump shaft 19. As illustrated in FIGS. 17A-D, two vertical pilot switch arms 20 and 22, which are mounted on shaft 19, extend downward from pump shaft 19 in the direction of pump control device 10. Post link driver 52 on pivot plate 50 extends frontward from pivot plate 50 between the two vertical pilot switch arms 20 and 22. Thus, when pump shaft 19 is in the extension phase, rightmost vertical pilot switch arm 22 makes contact with post link driver 52 and drives pivot plate 50 in a counterclockwise direction. When pump shaft 19 retracts, leftmost vertical pilot switch arm 20 makes contact with post link driver 52 and drives pivot plate 50 in a clockwise direction.

If pump 12 overstrokes its extension of thrust rod 33, the return force of extension spring 16 keeps T bar rocker 30 on ball 74 of retention air pilot 58 and thereby stops the extension overstroke and begins the retraction stroke. At first, during an overstroke condition, return post 28 is pulled away from contact with horizontal bar 31 of T bar rocker 30. As return post 28 is pulled further away from contact with horizontal bar 31, the return force of extension spring 16 increases and return post 28 is pulled back into contact with horizontal bar 31. Overstroke protection is not needed for the pump retraction phase, because pump shaft 19 reaches a reliable constant stopping point at the end of the retraction phase. Instead, the position of leftmost air pilot arm 20 along thrust rod 33 is adjusted for desired stroke length. With pump 12 in it's fully retracted position, leftmost vertical air pilot arm 20 is brought into contact with post link driver 52 thereby forcing pivot plate 50 fully clockwise into the pump's retraction position. Leftmost air pilot arm 20 is then locked into position by mechanical means such as with a collar 23 on shaft 19 and locking screw 25. As shown in FIG. 17A, leftmost vertical air pilot arm 20 is sequestered in left arm collar 23*a*, which is attached to thrust rod 33 by mechanical means. Rightmost vertical air pilot arm 22 is attached directly to thrust rod collar 23, also by mechanical means.

Optional Features

Figure 18:
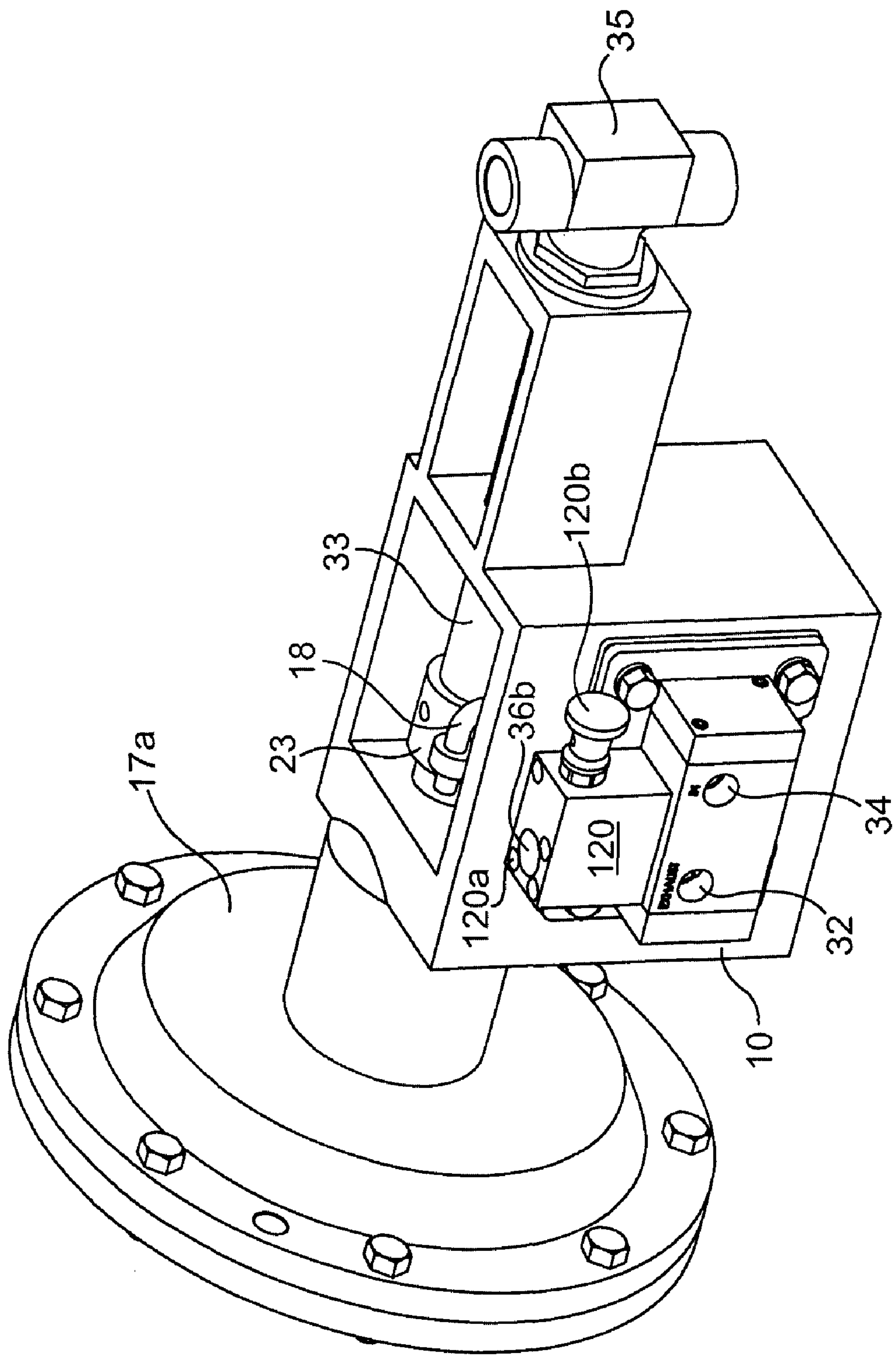
FIG. 18 is a perspective view of an optional component applied to the preferred embodiment.

FIG. 18 is a perspective view of an optional speed control 120 that may be used with the preferred embodiment of automatic pump control device 10. Device 10 controls the cycle of pump 12, while speed control 120 controls its actuation speed. As noted earlier, mounting holes 120*a* for mounting speed control 120 are on the top of main body 14. Mounting holes 120*a* on the main body 14 are designed to accept complimentary cap screws.

With speed control 120 in place, working gas port 36 is axially aligned with adjacent port 36*a* on speed control 120. Adjustment knob 120*b* enables manual adjustment of the set point of the actuation speed. This is accomplished by controlling gas flow (pressure, volume, etc.) between working gas port 36 and pump chamber 13 in any suitable manner. In the preferred embodiment illustrated, adjustment knob 120*b* adjusts a needle valve within speed control 120 to accomplish this task. Speed control 120 may also comprise any equivalent means of controlling the speed that is compatible with the design of other embodiments of automatic pump control device 10.

Advantages

Thousands of methanol injection pumps are currently installed in the field. It is, therefore, of great environmental and economic benefit to operate the currently installed injection pumps at substantially slower rates (strokes per minute) and to design new injection pumps to also operate at substantially slower rates. Automatic pump control devices as described and claimed in this application allow injection pumps to operate at substantially slower rates. Currently installed pumps may be retrofitted with automatic pump control devices in the field, with a minimum of time and effort; alternatively, automatic pump control devices can be incorporated into new injection pumps at the factory.

An automatic pump control device as described above enables a fluid injection pump to operate at a rate as low as one full stroke per 1.5 minutes (i.e., 0.67 stroke/min), which is substantially slower than current rates of approximately fifteen strokes per minute, as confirmed by tests performed as part of the development of prototypes of the preferred embodiment. This operation may be achieved over a wide range of flow rates and pressure ranges, thus enabling "bolt on" installation in the field, without calibration, on virtually all manufacturers' injection pumps.

The three-way, two position gas actuated control device provides several other advantages and advantageous features compared to existing technology, including: (a) protection of the device from overstroke during the extension phase of the pump; (b) shifting of the device from a first valve position to a second valve position by pulsing gas into a gas circuit, instead of the currently used direct mechanical linkage; (c) lubricious plating of the post link driver and arms of the pump to enable operation using little (if any) lubrication; (d) limitation of the force of high gas pressure of wellhead that is applied to the device; (e) elimination of deflection and twist of the injection pump diaphragm that occurs with currently used direct mechanical linkage between the pump shaft and the toggle switch mechanism; (f) minimization of sliding wear between the actuator ball and the T bar rocker, by limiting relative motion between the respective contacting elements and, in the case of the actuator ball, allowing it a degree of freedom to rotate; (g) control of the pump speed in either, or both, pump stroke directions by use of optional needle speed control valve to limit natural gas volume to the device; (h) the ability to slow stroke speed to near stand-still by the use of pulsed gas, instead of the currently used direct mechanical linkage; (i) extremely low natural gas consumption rates, due to operation of the injection pumps at low cycle rates, which substantially reduces the amount of natural gas that is currently vented to the atmosphere; (j) more controlled emission of exhaust gas by routing it to a single exhaust port; (k) fast, efficient, and simple retrofit installation in-the-field, or in the shop; and (l) easy inclusion of the device as an integral part of newly manufactured injection pumps.

We claim:

1. An automatic control device for an injection pump used to inject a fluid into a source of a pressurized gas; the injection pump comprising a shaft that extends and refracts, and a linkage mounted to the shaft for actuating the injection pump; the linkage having first and second portions respectively corresponding to extension and refraction of the shaft, the automatic control device comprising:

a) a two position toggle valve, driven by the pressurized gas, to pulse between first and second positions that correspond to the extension and retraction of the shaft, respectively;

b) a driver, coupled to the toggle valve, having first and second single-point contact surfaces corresponding to the first and second portions of the linkage of the injection pump; and c) an overstroke mechanism to prevent overdriving the injection pump beyond full extension;

in which the toggle valve pulses in a two-stroke cycle between the first and second positions to couple the respective first and second single-point contact surfaces of the driver to the respective first and second portions of the linkage, thereby alternatively causing the extension and retraction of the shaft of the injection pump.

2. The device of claim 1, further comprising an adjustment valve for adjustment of stroke speed.

3. The device of claim 1, in which the injection pump injects a fluid into a fossil fuel well.

4. A method of controlling injection of a fluid by an injection pump into a source of a pressurized gas, comprising:

a) using the pressurized gas to power a two position toggle valve to automatically pulse in a two-stroke cycle corresponding to first and second positions of the injection pump; and b) preventing overdriving of the injection pump beyond full extension.

5. The method of claim 4, further comprising coupling respective first and second single-point contact surfaces of a driver acting in the two-stroke cycle to respective first and second portions of a linkage coupled to the injection pump.

6. The method of claim 5, in which the linkage is coupled to a shaft of the injection pump.

7. The method of claim 4, further comprising adjusting stroke speed.

8. The method of claim 4, in which the injection pump injects a fluid into a fossil fuel well.

* * * * *